US009001279B2

(12) United States Patent
Kobayashi et al.

(10) Patent No.: US 9,001,279 B2
(45) Date of Patent: Apr. 7, 2015

(54) POLARIZATION CONVERSION DEVICE, POLARIZATION CONVERSION UNIT, AND PROJECTION TYPE VIDEO APPARATUS

(75) Inventors: Shuho Kobayashi, Matsumoto (JP); Mitsuru Miyabara, Matsumoto (JP); Makoto Sakurai, Okaya (JP)

(73) Assignee: Seiko Epson Corporation, Suwa-shi, Nagano (JP)

( * ) Notice: Subject to any disclaimer, the term of this patent is extended or adjusted under 35 U.S.C. 154(b) by 75 days.

(21) Appl. No.: 13/313,546

(22) Filed: Dec. 7, 2011

(65) Prior Publication Data
US 2012/0188471 A1 Jul. 26, 2012

(30) Foreign Application Priority Data

Jan. 21, 2011 (JP) ................. 2011-011086

(51) Int. Cl.
G02F 1/1335 (2006.01)
G03B 21/20 (2006.01)
G02B 27/28 (2006.01)
H04N 9/31 (2006.01)

(52) U.S. Cl.
CPC .......... *G03B 21/2073* (2013.01); *G02B 27/283* (2013.01); *H04N 9/3167* (2013.01)

(58) Field of Classification Search
CPC . G03B 21/2073; G02B 27/283; H04N 9/3167
USPC ....................... 349/58–60, 9, 8, 10
See application file for complete search history.

(56) References Cited

U.S. PATENT DOCUMENTS

| 6,144,492 | A | 11/2000 | Iwamura et al. |
| 6,199,987 | B1 | 3/2001 | Haba et al. |
| 6,312,130 | B2 | 11/2001 | Haba et al. |
| 6,404,550 | B1 * | 6/2002 | Yajima ............... 359/485.04 |
| 6,523,962 | B2 | 2/2003 | Yajima |
| 6,728,020 | B2 | 4/2004 | Akitaka |
| 7,922,331 | B2 | 4/2011 | Sakai |
| 2001/0000972 | A1 | 5/2001 | Haba et al. |
| 2002/0131027 | A1 | 9/2002 | Takezawa et al. |

(Continued)

FOREIGN PATENT DOCUMENTS

| JP | A1 WO 98/23993 | 6/1998 |
| JP | A-11-242186 | 9/1999 |
| JP | A-2000-298212 | 10/2000 |
| JP | A-2002-014419 | 1/2002 |
| JP | B2-3610764 | 1/2005 |

(Continued)

*Primary Examiner* — Richard Kim
*Assistant Examiner* — Kendrick Hsu
(74) *Attorney, Agent, or Firm* — Oliff PLC

(57) ABSTRACT

A polarization separation device includes a transmissive substrate formed of crystalline material having a birefringent property and an optical rotatory property, and a polarization separation portion that is provided on an incidence-side surface of the transmissive substrate and transmits P-polarized light and reflects S-polarized light. A reflective element, which reflects the S-polarized light reflected by the polarization separation portion, is disposed substantially in parallel with the transmissive substrate. A phase difference plate is disposed at an emission-side of the transmissive substrate. The P-polarized light, which is transmitted through the polarization separation portion and is incident to the transmissive substrate, is made to be emitted from an emission-side surface of the transmissive substrate while maintaining a polarization plane thereof, and the polarization plane of the P-polarized light transmitted through the transmissive substrate is converted to be as S-polarized light in the phase difference plate.

22 Claims, 39 Drawing Sheets

(56) References Cited

U.S. PATENT DOCUMENTS

| | | | |
|---|---|---|---|
| 2004/0145711 A1 | 7/2004 | Takezawa et al. | |
| 2009/0015794 A1* | 1/2009 | Sakai | 353/20 |
| 2009/0284708 A1* | 11/2009 | Abdulhalim | 349/198 |
| 2010/0103084 A1 | 4/2010 | Oto | |
| 2010/0151231 A1 | 6/2010 | Matsuo et al. | |
| 2010/0225885 A1* | 9/2010 | Miyazawa | 353/20 |
| 2010/0323192 A1 | 12/2010 | Matsuo et al. | |
| 2010/0323193 A1 | 12/2010 | Matsuo et al. | |

FOREIGN PATENT DOCUMENTS

| | | |
|---|---|---|
| JP | A-2005-158121 | 6/2005 |
| JP | A-2008-065279 | 3/2008 |
| JP | A-2009-103863 | 5/2009 |
| JP | B2-4277514 | 6/2009 |
| JP | B2-4329852 | 9/2009 |
| JP | B2-4337935 | 9/2009 |
| JP | A-2010-60770 | 3/2010 |
| JP | A-2010-134414 | 6/2010 |

* cited by examiner

POLARIZATION CONVERSION DEVICE, POLARIZATION CONVERSION UNIT, AND PROJECTION TYPE VIDEO APPARATUS

BACKGROUND

1. Technical Field

The present invention relates to a polarization conversion device, and a polarization conversion unit and a projection type video apparatus that are provided with the polarization conversion device.

2. Related Art

A projection type video apparatus such as a liquid crystal projector modulates light emitted from a light source device according to image information, and enlarges this modulated optical image and projects it onto a screen. In this liquid crystal projector, a polarization conversion device is used to improve efficiency for light utilization. The polarization conversion device divides light (hereinafter, referred to as random light) including randomly polarized light (P-polarized light and S-polarized light whose polarization planes are orthogonal to each other, or light in which linearly polarized light having various polarization-plane directions is mixed), which is emitted from a light source device, into a plurality of intermediate light beams, and converts these divided intermediate light beams into one kind of linearly polarized light for collective emission.

This polarization conversion device has a configuration in which a polarization separation film and a reflective film are disposed alternately in a transparent member to form a polarization beam splitter array, and a phase difference plate is provided on a surface of the polarization beam splitter array. A plurality of phase difference plates is disposed at a position corresponding to the polarization separation film at the side of a light emitting plane of a transparent member for each predetermined interval (refer to JP-A-2000-298212).

As the phase difference plate in the related art, ½ wavelength plate formed of an organic material, for example, a polycarbonate film is used, and this ½ wavelength plate and the polarization beam splitter array are bonded to each other by an organic adhesive.

As a method of manufacturing the polarization conversion device, a transmissive substrate such as colorless transparent glass, which includes a polarization separation film and a reflective film formed on both principal planes, respectively, is repeatedly laminated to form a laminated body, and a ½ wavelength plate is adhered with an adhesive to an emission plane of a lens array, which is obtained through a cutting at an angle of 45 deg with respect to an incidence plane.

The polarization conversion device manufactured in this way is mounted in an optical engine of liquid crystal projector in a state of being assembled in a frame having a planar rectangular shape (refer to Japanese Patent No. 3610764).

Progress has been made regarding the high output and the short arc length of a white-colored light source lamp, and a thermal load with respect to the polarization beam splitter array and the ½ wavelength plate bonded to the polarization beam splitter array has been increased, such that the use of quartz crystal as a material making up the ½ wavelength plate is considered. Here, a liquid crystal projector in which as the adhesive, an adhesive of an ultraviolet curable resin or an inorganic material that is excellent in heat resistance and light resistance is used, in a case where the ½ wavelength plate is disposed to be bonded to an emission-side side surface of the polarization beam splitter array, and accordingly, compulsory air cooling using a cooling fan is unnecessary is disclosed (refer to JP-A-2009-103863).

In addition, in regard to a combination of the ½ wavelength plate formed of quartz crystal and the polarization beam splitter array, from problems related to a mutual flatness and positioning, or the like, there is disclosed a polarization conversion unit that includes a polarization separation device (polarization beam splitter) including a plurality of polarization separation films that is disposed to be inclined with respect to incident light beams and that separates the incident light beams into two kinds of linearly polarized light beams, a plurality of reflective films that is disposed alternately and parallel between the respective polarization separation films and that reflects any one side of the linearly polarized light beams that are separated by the polarization separation film, and a transmissive member provided with the polarization separation film and the reflective film; a plurality of phase difference plates that is formed of a quartz crystal member that converts a polarization plane of any one side of the linearly polarized light beams that are separated by the polarization separation film into a polarization plane of the other side of the linearly polarized light beams; and a spacer member that adheres an end of the phase difference plate to a beam emission side of the transmissive member (refer to Japanese Patent No. 4329852). Here, in the spacer member, adhesion correction of the object to be adhered is allowed, and a dimension G of an interval between the polarization separation device array and the phase difference plate is optimally with a range of 0.01 mm≤G≤0.3 mm.

In recent years, along with an increasing request for a long operating life as an optical part, there is a problem related to deterioration of the adhesive.

To solve such a problem, there is disclosed a bonding method in which as means for bonding two sheets of transmissive substrates formed of glass, quartz crystal, or the like, a bonding film, which includes, on a surface thereof, an Si skeleton having a siloxane (Si—O) bond and having a degree of crystallinity of 45% or less and an elimination group consisting of an organic group coupled to the Si skeleton, is formed by a plasma polymerization method, and then an energy is applied to the bonding film, and thereby the elimination group present in the vicinity of the surface of the bonding film is eliminated from the Si skeleton and due to an adhesive property exhibited at a region of the surface of the bonding film, the two sheets of transmissive substrates are bonded (refer to Japanese Patent No. 4337935). Furthermore, in the related art, there is disclosed a polarization conversion device in which a light incidence plane and a light emission plane that is approximately parallel with the light incidence plane are provided, a plurality of transmissive members, polarization separation films, reflective films, phase plates, and plasma polymerized films are disposed along the light incidence plane and the light emission plane, either the polarization separation film or the reflective film is provided on an inclined surface of each of partial transmissive members among the plurality of transmissive members, and the plasma polymerized film is provided on at least one of a surface of an inclined plane of the transmissive member, a surface of the polarization separation film, and a surface of the reflective film (refer to JP-A-2010-60770). In an example of the related art disclosed in JP-A-2010-60770, at least one of between the transmissive member and the reflective film that are adjacent to each other, between the transmissive member and the phase plate that are adjacent to each other, and between the phase plate and the polarization separation film that are adjacent to each other is molecular-bonded by the plasma polymerized film, and the plasma polymerized film includes polyorganosiloxane as a main material thereof.

However, in an example of the related art disclosed in JP-A-2010-60770, there is a problem in that the bonding film formed of a plasma polymerized film is an extremely thin film of several tens of nm, and when an attached substance such as dust and contaminant attaches to a surface of a transmissive substrate while the bonding film is formed on the surface of the transmissive substrate using a plasma polymerization method, the height of the attached substance becomes far larger than the film thickness of the bonding film, such that the transmissive substrates are not bonded at a predetermined region around a region to which the attached substance is attached, and bubbles or the like are introduced into the region and thereby a severe adverse effect may result in regard to an optical characteristic, the bonding reliability, and the product lifetime.

Therefore, as a related art not using the plasma polymerized film, PCT Japanese Patent Domestic Re-publication No. WO98/23993 may be exemplified. In PCT Japanese Patent Domestic Re-publication No. WO98/23993, an optical block is configured in such a manner that optical parts such as a PBS (polarization beam splitter), a mirror, and ½ wavelength plate are mounted with respect to a groove formed in a substrate. The PBS is formed through a deposition of, for example, $TiO_2$ or the like on a surface of a glass plate, and is press-fitted into the substrate at a predetermined angle with respect to an incidence direction of light. The mirror is formed through a deposition of, for example, aluminum or a dielectric multi-layer film on a surface of a rectangular glass plate so as to be able to reflect incident light. The mirror is mounted on the substrate at an angle of reflecting an S-wave that is separated and reflected by the PBS to an emission-side. The ½ wavelength plate is formed by adhering a ½ phase difference film obtained through a uniaxial drawing of, for example, polycarbonate, polyvinyl alcohol, or polyethylene terephthalate to a rectangular glass plate. The ½ wavelength plate is mounted at a position where the S-wave reflected by the mirror is incident, and polarizes the S-wave into a P-wave and outputs the P-wave. As described above, the optical block is configured by the PBS, the mirror, ½ wavelength plate, or the like, such that randomly polarized light including the incident P-wave (P-polarized light) and the S-wave (S-polarized light) may be emitted as the unified P-wave (P-polarized light) only, and an incidence-side area and an emission-side area of the optical block may be substantially the same as each other.

Quartz crystal has not only a birefringent property but also an optical rotatory property, and there is a well-known problem in that this optical rotatory property has an effect on a phase difference characteristic of wavelength plate formed of quartz crystal.

In regard to this problem, there is proposed a ¼ wavelength plate configured in such a manner that two wavelength plates formed of an optical crystalline material having an optical rotatory power are disposed and laminated such that respective crystal optical axes thereof intersect with each other at a predetermined angle, and a relationship of a birefringent phase difference, an optical axis azimuthal angle, an optical rotatory power, and an angle made by a rotary axis and a neutral axis of both wavelength plates satisfy a predetermined relational equation obtained by an approximate equation through an analysis of a polarized light trajectory using a Poincare sphere, and as a result thereof, the reduction in the effect caused by the optical rotatory power and the improvement in a characteristic in a broad band are attempted (refer to JP-A-2005-158121).

In addition, in regard to one sheet of a wavelength plate formed of an inorganic material such as quartz crystal, there is proposed a ¼ wavelength plate showing an excellent optical characteristic, which is formed of a crystalline plate of an inorganic material such as quartz crystal that has a birefringent property and an optical rotatory property and shows a sufficient light resistance and reliability against a bluish purple laser showing a high output with a short wavelength, and in which an ellipticity may be set to an optimal value, that is, a high value of 0.9 or more and substantially near 1 (refer to JP-A-2010-134414).

However, in the example of the related art disclosed in PCT Japanese Patent Domestic Re-publication No. WO98/23993, in regard to the PBS, a dielectric multi-layer film, which is formed by alternately and repeatedly laminating $TiO_2$ (high refractive index material) and $SiO_2$ (low refractive index material), or the like, is deposited on a surface of a glass substrate, and thereby a polarization separation film is formed. Accordingly, there is a concern that separation may occur at the interface between the glass substrate and the polarization separation film due to a thermal distortion caused by a difference in a thermal expansion coefficient, as well as that heat dissipation in the glass plate may be restricted, such that the strong demand for heat resistance and a long operating life is not sufficiently satisfied.

Here, in consideration of a heat dissipation effect, it may be considered to use a quartz crystal plate instead of the glass substrate in the PBS, but quartz crystal has an optical rotatory property as well as a birefringent property, such that in the configuration where the glass plate is simply substituted with the quartz crystal plate, it is difficult to solve a problem related to the optical rotatory property through only the determination of a crystalline optical axis such that a phase difference does not occur from a relationship of the polarization plane of the incident linearly-polarized light, and therefore there is a problem in that an optical action caused by an optical rotatory power of the incident linearly-polarized light occurs.

Here, it may be considered to realize the polarization separation device capable of transmitting the incident P-polarized light without causing any optical action through an application of a technical idea in the example of the related art disclosed in JP-A-2005-158121 and JP-A-2010-134414 in which the effect on the phase difference caused by the optical rotatory power is focused, but it is difficult to solve the problem posed by the present inventors through an application of JP-A-2005-158121 and JP-A-2010-134414 that are related to the optical rotatory power compensating technology, which improves the effect caused by the optical rotatory power with respect to the birefringent phase difference which the ¼ wavelength plate formed of quartz crystal has, to PCT Japanese Patent Domestic Re-publication No. WO 98/23993 without modification.

SUMMARY

An advantage of some aspects of the invention is to provide a polarization conversion device, a polarization conversion unit, and a projection type video apparatus, which are capable of realizing a compact structure, a heat resistance and a long operating life.

APPLICATION EXAMPLE 1

This application example of the invention is directed to a polarization conversion device including a transmissive substrate that is disposed to form a predetermined angle with respect to incident light; a polarization separation portion that is disposed at an incidence-side surface of the transmissive substrate, separates the incident light into first linearly polarized light and second linearly polarized light that are orthogonal to each other, transmits the first linearly polarized light, and reflects the second linearly polarized light; and a reflective element that is disposed substantially in parallel with the transmissive substrate, and that reflects the second linearly polarized light reflected by the polarization separation portion in a direction that is substantially parallel with an optical path of the first linearly polarized light that is transmitted through the polarization separation portion. The transmissive substrate is formed of a crystalline material that has a birefringent property and an optical rotatory property, the first linearly polarized light, which is transmitted through the polarization separation portion and is incident to the transmissive substrate, is emitted from an emission-side surface of the transmissive substrate while maintaining a polarization plane of the first linearly polarized light, and a phase difference plate is disposed at the emission-side of the transmissive substrate, converts the polarization plane of the first linearly polarized light that is transmitted through the transmissive substrate so as to be parallel with the polarization plane of the second linearly polarized light, and emits it as second linearly polarized light.

According to this application example, the polarization separation device configured by providing the polarization separation portion on the transmissive substrate, and the reflective element make up a lens array, such that a transparent member such as glass provided between the polarization separation device and the reflective element is unnecessary and thereby the structure becomes compact.

Furthermore, as the transmissive substrate, the crystalline material having a thermal conductivity higher than that of glass is used, such that a heat dissipation effect becomes high compared to a configuration in the related art, and a heat resistance and a long operating life may be realized.

In addition, the crystalline material has a birefringent property and an optical rotatory property, such that there is a problem in that a vibration plane of linearly polarized light that propagates in an optical axis direction may be distorted as light propagates, and thereby a polarization state may vary and a polarization conversion efficiency may decrease, but according to this aspect, the first linearly polarized light, which is transmitted through the polarization separation portion and is incident to the transmissive substrate, is emitted from the emission-side surface of the transmissive substrate while maintaining the polarization plane of the first linearly polarized light, such that it is possible to remove the variation in the polarization state.

APPLICATION EXAMPLE 2

This application example of the invention is directed to the polarization conversion device, wherein the predetermined angle is substantially 45 (deg) or 135 (deg).

According to this configuration, it is possible to reflect the second linearly polarized light toward the reflective element in a direction that is substantially orthogonal to the incident light by the polarization separation portion, such that it is possible to reflect the light beam, which is reflected by the reflective element, in a direction that is substantially parallel with an optical path of the first linearly polarized light.

APPLICATION EXAMPLE 3

This application example of the invention is directed to the polarization conversion device, wherein the crystalline material is quartz crystal.

According to this configuration, by using quartz crystal that is available at a lower cost than a crystalline material such as sapphire as a crystalline material, it is possible to provide the polarization conversion device at low cost.

APPLICATION EXAMPLE 4

This application example of the invention is directed to the polarization conversion device, wherein, when an angle made by a projection optical axis in which a crystal optical axis of the transmissive substrate is projected onto a plane orthogonal to an optical axis of the incident light, and the polarization plane of the first linearly polarized light is set as an azimuthal angle θ, θ is 0 (deg).

According to this configuration, θ is 0 (deg), such that it is possible to easily set the transmissive substrate having a high polarization conversion efficiency under a condition in which a phase difference Γ does not occur by a linear birefringent property (Γ=0).

APPLICATION EXAMPLE 5

This application example of the invention is directed to the polarization conversion device, wherein, when an angle made by the crystal optical axis of the transmissive substrate and the optical axis of the incident light is set as an intersection angle x, an axis, which is taken in a direction orthogonal to a plane including the crystal optical axis and the optical axis of the incident light at an intersection point of the crystal optical axis of the transmissive substrate and the optical axis of the incident light, is set as a central axis, and when seen from a direction orthogonal to the plane including the crystal optical axis and the optical axis of the incident light, a counterclockwise direction of the central axis is set as a positive side, the intersection angle x satisfies a relationship of −90 (deg)≤x≤+90 (deg).

According to this configuration, when the intersection angle x is set to satisfy a relationship of −90 (deg)≤x≤+90 (deg), it is possible to reliably allow the first linearly polarized light, which is transmitted through the polarization separation portion and is incident to the transmissive substrate, to be emitted from the emission-side surface of the transmissive substrate while maintaining the polarization plane of the first linearly polarized light.

APPLICATION EXAMPLE 6

This application example of the invention is directed to the polarization conversion device, wherein the intersection angle x and the maximum value y in the plate thickness of the transmissive substrate satisfies relationships of −90 (deg)≤x≤−80 (deg), and $y=-0.0058x^2-0.9672x-38.858$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 7

This application example of the invention is directed to the polarization conversion device, wherein the intersection angle x and the maximum value y in the plate thickness of the transmissive substrate satisfies relationships of −80 (deg)<x≤−55 (deg), and $y=2\times10^{-6}x^5+0.0008x^4+0.1145x^3+7.9738x^2+276.92x+3842.1$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 8

This application example of the invention is directed to the polarization conversion device, wherein the intersection angle x satisfies a relationship of −55 (deg)<x≤−35 (deg).

According to this configuration, when the intersection angle x is under the above-described condition, particularly, it approaches −45 (deg), it is possible to obtain a good polarization conversion efficiency regardless of the maximum value y of the plate thickness. That is, when the intersection angle x is under the above-described condition, a plate thickness of the transmissive substrate becomes free, and thereby it is possible to set the thickness to an arbitrary thickness.

APPLICATION EXAMPLE 9

This application example of the invention is directed to the polarization conversion device, wherein the intersection angle x and the maximum value y in the plate thickness of the transmissive substrate satisfies relationships of −35 (deg)<x≤−15 (deg), and $y=-4\times10^{-5}x^4-0.0045x^3-0.1828x^2-3.1831x-18.449$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 10

This application example of the invention is directed to the polarization conversion device, wherein the intersection angle x and the maximum value y in the plate thickness of the transmissive substrate satisfies relationships of −15 (deg)<x≤+5 (deg), and $y=9\times10^{-6}x^4+0.0002x^3+0.0071x^2+0.1786x+2.4607$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 11

This application example of the invention is directed to the polarization conversion device, wherein the intersection angle x and the maximum value y in a plate thickness of the transmissive substrate satisfies relationships of +5 (deg)<x≤+10 (deg), and $y=-0.5597x+6.3541$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 12

This application example of the invention is directed to the polarization conversion device, wherein the intersection angle x and the maximum value y in the plate thickness of the transmissive substrate satisfies relationships of +10 (deg)<x≤+30 (deg), and $y=1\times10^{-5}x^4-0.0008x^3-0.0224x^2-0.2833x+2.0276$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 13

This application example of the invention is directed to the polarization conversion device, wherein the intersection angle x and a maximum value y in the plate thickness of the transmissive substrate satisfies relationships of +30 (deg)<x≤+35 (deg), and $y=0.3878x-10.931$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 14

This application example of the invention is directed to the polarization conversion device, wherein the intersection angle x and the maximum value y in the plate thickness of the transmissive substrate satisfies relationships of +35 (deg)<x≤+75 (deg), and $y=5\times10^{-9}x^6-2\times10^{-6}x^5+0.0002x^4-0.0176x^3+0.7441x^2-16.972x+165.72$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 15

This application example of the invention is directed to the polarization conversion device, wherein the intersection angle x and the maximum value y in the plate thickness of the transmissive substrate satisfies relationships of +75 (deg)<x<+90 (deg), and $y=9\times10^{-5}x^3-0.0215x^2+1.6761x-42.176$ (mm).

According to this configuration, when the maximum value y in the plate thickness is set within the above-described range in a case where the intersection angle x is under the above-described condition, it is possible to obtain a good polarization conversion efficiency.

APPLICATION EXAMPLE 16

This application example of the invention is directed to the polarization conversion device, wherein the polarization separation portion is formed of a metallic wire grid.

According to this configuration, when the polarization separation portion is formed of the metallic wire grid, it is possible to manufacture the polarization conversion device in a simple manner.

APPLICATION EXAMPLE 17

This application example of the invention is directed to the polarization conversion device, wherein the polarization separation portion is formed of a dielectric multi-layer film.

According to this configuration, when the polarization separation film is formed of the dielectric multi-layer film, it is possible to manufacture the polarization conversion device in a simple manner.

APPLICATION EXAMPLE 18

This application example of the invention is directed to the polarization conversion device, wherein the reflective element includes a quartz crystal plate, and a mirror portion provided on a surface of the quartz crystal plate.

According to this configuration, the plate member in which the mirror portion is provided is formed of not glass but quartz crystal, the heat dissipation effect becomes high not only in the transmissive substrate but also in the reflective element, and thereby the heat resistance and long operating life may be further realized.

APPLICATION EXAMPLE 19

This application example of the invention is directed to a polarization conversion unit including a polarization conversion device having the above-described configuration; and a maintaining member that maintains the polarization conversion device. The maintaining member includes a pair of maintaining plates that maintains both ends of the transmissive substrate and both ends of the reflective element, respectively, and a pair of connecting plates that connects both the ends of the pair of maintaining plates, respectively.

According to this aspect, it is possible to accommodate the polarization separation device including the transmissive substrate and the polarization separation portion, and the reflective element in the maintaining member in a compact manner, such that handling becomes convenient.

APPLICATION EXAMPLE 20

This application example of the invention is directed to the polarization conversion unit, wherein the pair of maintaining plates and the pair of connecting plates are integrally formed, at portions, which are opposite to each other, of the pair of maintaining plates, guide grooves, which guide the transmissive substrate and the reflective element, respectively, are formed, and the guide grooves are opened toward one side surface of the pair of maintaining plates.

According to this configuration, it is possible to assemble the polarization conversion unit by inserting the polarization separation device and the reflective element along the guide grooves, such that an assembling work becomes easy.

APPLICATION EXAMPLE 21

This application example of the invention is directed to the polarization conversion unit, wherein the pair of maintaining plates and the pair of connecting plates are formed as individual members, and the pair of connecting plates includes an engagement piece that biases the pair of maintaining plates in a direction facing each other.

According to this configuration, the pair of connecting plates biases the pair of maintaining members in a direction in which the pair of maintaining members becomes close to each other, such that the polarization separation device and the reflective element are reliably maintained, and thereby it is possible to prevent the polarization separation device or the reflective element from being detached from a polarization separation unit.

APPLICATION EXAMPLE 22

This application example of the invention is directed to a projection type video apparatus including a light source; a polarization conversion device that converts light emitted from the light source into a second linearly polarized light and outputs this light; an optical modulation unit that modulates the outgoing light from the polarization conversion device according to image information to be projected; and a projection optical system that projects light modulated by the optical modulation unit. The polarization conversion device is a polarization conversion device having the above-described configuration.

According to this configuration, the polarization conversion efficiency of the polarization conversion device becomes high, such that it is possible to provide a projection type video apparatus having high projection accuracy.

APPLICATION EXAMPLE 23

This application example of the invention is directed to the projection type video apparatus, wherein the optical modulation unit is a liquid crystal panel.

According to this configuration, it is possible to provide a liquid crystal projector having the above-described effect.

BRIEF DESCRIPTION OF THE DRAWINGS

The invention will be described with reference to the accompanying drawings, wherein like numbers reference like elements.

FIGS. 3A and 3B illustrate a relationship of an optical axis azimuth, a plate thickness, and a cutting angle in a wavelength plate formed of quartz crystal, in which FIG. 3A is an end elevational view and FIG. 3B is a perspective view.

DESCRIPTION OF EXEMPLARY EMBODIMENTS

Figure 1:
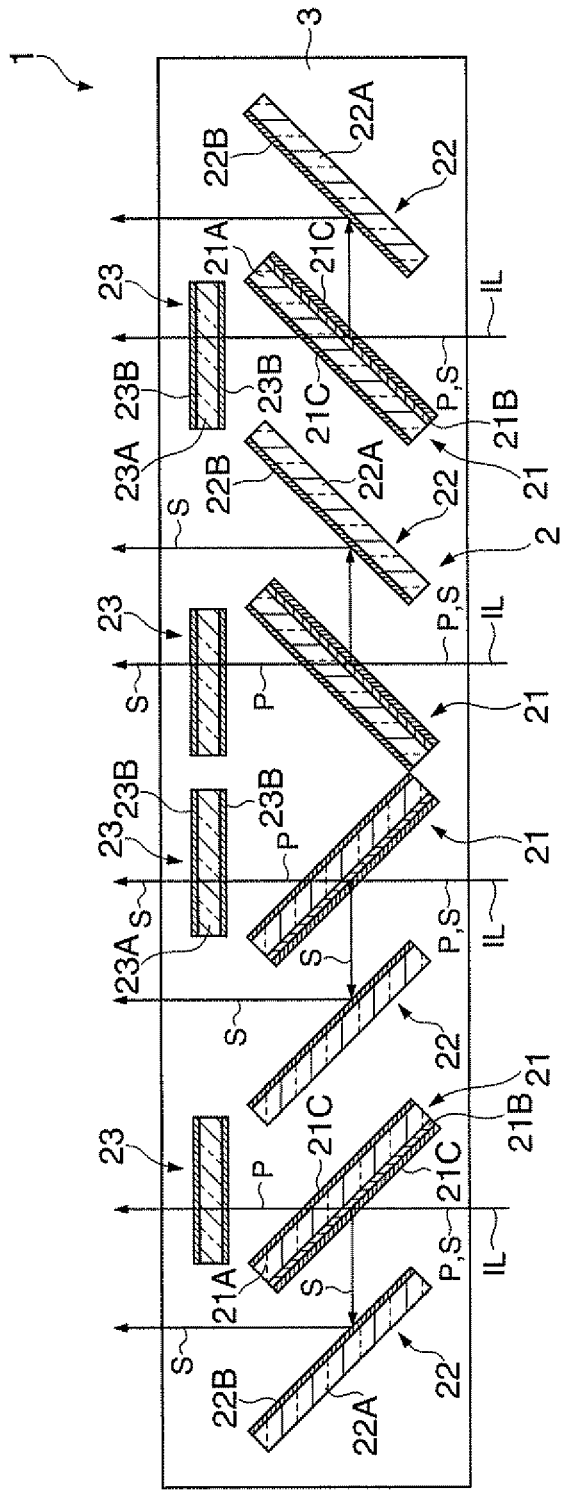
FIG. 1 is a schematic diagram illustrating a polarization conversion device according to a first embodiment of the invention.

Embodiments of the invention will be described with reference to the accompanying drawings. Here, in each embodiment, like reference numerals will be given to like parts having the substantially the same functions, and description thereof will not be repeated.

FIGS. 1 to 31C illustrate the first embodiment.

FIG. 1 shows an outline of the first embodiment.

In FIG. 1, a polarization conversion unit 1 of the first embodiment includes a polarization conversion device 2, and a maintaining member 3 that maintains the polarization conversion device 2. The maintaining member 3 is a plate member that has a planar rectangular shape and is formed of, for example, a synthetic resin.

The polarization conversion device 2 includes a polarization separation device 21 and a reflective element 22 that are disposed alternately, and a phase difference plate 23 that is disposed at a light emitting plane side of the polarization separation device 21, one end of each of the polarization separation device 21, the reflective element 22, and the phase difference plate 23 is fitted into a concave portion of the maintaining member 3 (not shown).

Plural sheets of the polarization separation device 21 and the reflective element 22, for example, two sheets each, are disposed at the left side and the right side of a center of the maintaining member 3 in FIG. 1, among these, the polarization separation device 21 and the reflective element 22 that are disposed at the left side with respect to the center, and the polarization separation device 21 and the reflective element 22 that are disposed at the right side are disposed in a symmetric relation.

The polarization separation device 21 includes a transmissive substrate 21A and an antireflective portion 21C. An incidence-side principal surface and an emission-side principal surface of the transmissive substrate 21A are disposed to make a predetermined angle with respect to incident light IL, in this embodiment, 45 deg. The antireflective portion 21C is disposed on a surface of a polarization separation portion 21B that is disposed at an incidence-side surface of the transmissive substrate 21A and that separates the incident light IL into P-polarized light P that is first linearly polarized light and S-polarized light S that is second linearly polarized light, which are orthogonal to each other, and transmits the P-polarized light P and reflects the S-polarized light S. The antireflective portion 21C is also disposed on a principal plane (emission-side principal plane), at the side where the incident light IL is incident, which is opposite to a principal plane of the transmissive substrate 21A on which the polarization separation portion 21B is disposed.

The transmissive substrate 21A is formed of quartz crystal having a birefringent property and an optical rotatory property in a planar rectangular plate shape.

The polarization separation portion 21B is formed of a dielectric multi-layer film including a low refraction index layer formed of, for example, a silicon oxide ($SiO_2$), and a high refraction index layer formed of, for example, an aluminum oxide ($Al_2O_3$), which are formed in predetermined sequences and a predetermined optical film thickness and are optically in-plane uniform.

The antireflective portion 21C is formed through a vapor deposition of a material such as a dielectric multi-layer film in which, for example, a silicon dioxide and a titanium oxide that are alternately and sequentially laminated.

The reflective element 22 reflects the S-polarized light S, which is separated and reflected by the polarization separation portion 21B, in a direction that is substantially parallel with an optical path of the P-polarized light P transmitted through the polarization separation portion 215, and includes a quartz crystal plate 22A and a mirror portion 22B that is provided on a surface of the quartz crystal plate 22A.

The mirror portion 22B is formed of a multi-layer film that is formed through a vapor deposition of a material such as a silicon dioxide and a titanium oxide.

The phase difference plate 23 includes a ½ wavelength plate 23A that is disposed at the emission-side of the transmissive substrate 21A and that converts a polarization plane of the P-polarized light P transmitted from the transmissive substrate 21A so as to be parallel with a polarization plane of the S-polarized light S, and an antireflective portion 23B that is provided on both surfaces of the ½ wavelength plate 23A. The antireflective portion 23B is the same as the antireflective portion 21C provided to the polarization separation device 21.

Figure 2A:
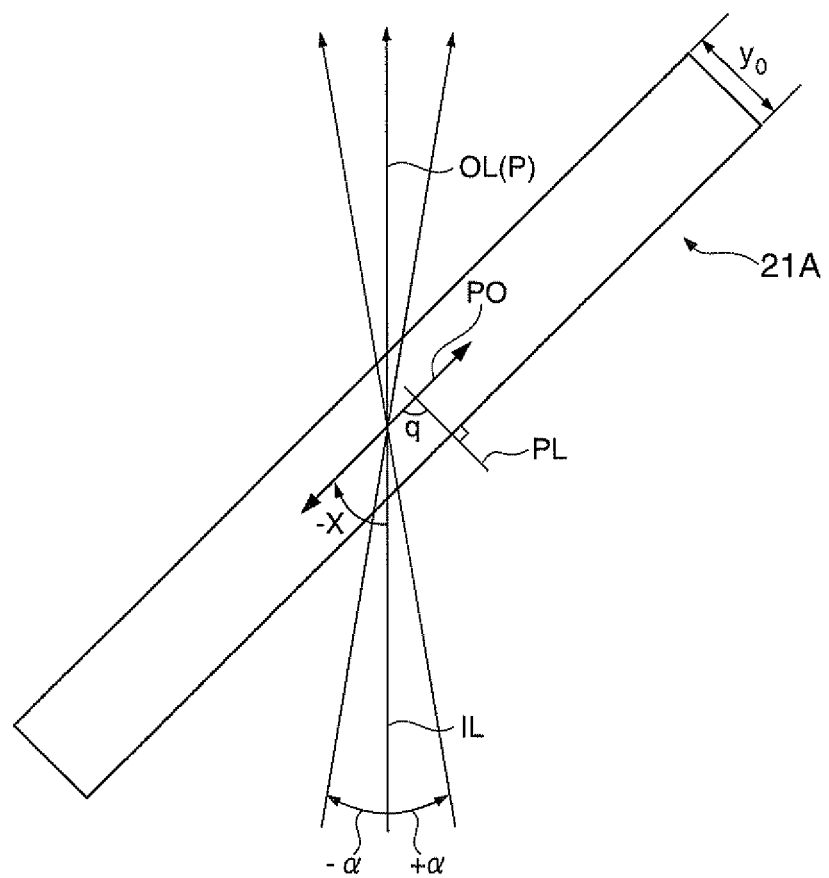
FIG. 2A is an end elevational view illustrating a quartz crystal plate making up the polarization separation device.
Figure 2B:
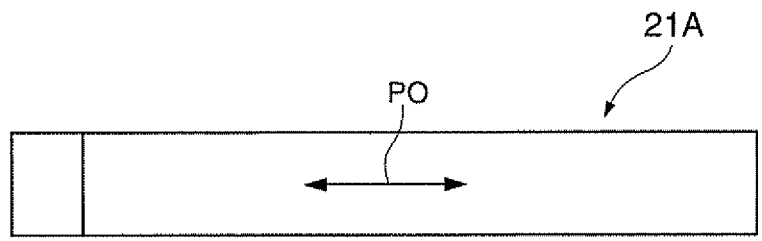
FIG. 2B is a front elevational view illustrating a part of the quartz crystal plate.

A schematic configuration of the transmissive substrate 21A is shown in FIGS. 2A and 2B. FIG. 2A shows a schematic view of the transmissive substrate 21A seen from an end surface, and FIG. 2B shows a front elevational view illustrating a part of the transmissive substrate 21A.

In FIG. 2A, the transmissive substrate 21A has a plate thickness of yo. The incident light IL is incident to the transmissive substrate 21A and is transmitted therethrough as outgoing light OL. The incident light IL is incident at a divergence angle ranging from +α to −α. The outgoing light OL is emitted at a divergence angle ranging from +α to −α in correspondence with the incident light IL.

An angle made by a normal line PL that is perpendicular to the principal plane of the transmissive substrate 21A and a crystal optical axis PO is a cutting angle q.

An angle made by the crystal optical axis PO of the transmissive substrate 21A and the optical axis of the incident light IL is an intersection angle x.

The transmissive substrate 21A of the polarization separation device 21 is made of a quartz crystal plate having a birefringent property and an optical rotatory property, such that it is necessary to work out a design in order for a polarization conversion efficiency of the outgoing light OL with respect to the incident light IL to be increased.

Figure 3A:
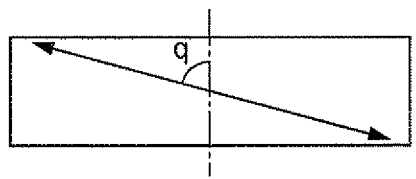
Figure 3B:
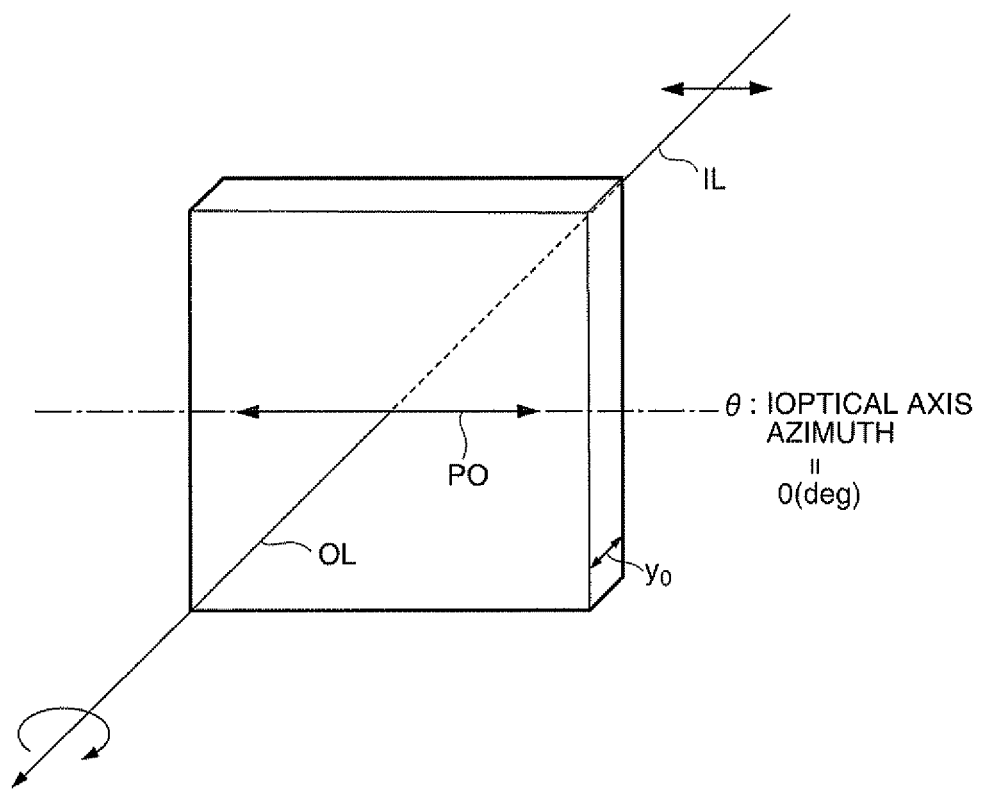

A background of this design will be described with reference to FIGS. 3A to 4. FIGS. 3A and 3B illustrate a relationship of an optical axis azimuth, a plate thickness, and a cutting angle in a wavelength plate formed of quartz crystal, in which FIG. 3A is an end elevational view and FIG. 3B is a perspective view.

In general, parameters for designing the wavelength plate formed of the quartz crystal include an optical axis azimuth θ, an optical rotatory power set by a cutting angle q, and a phase difference Γ set by a plate thickness yo. Here, definition is made by Poincare sphere.

As shown in FIGS. 2A and 2B, the present inventors set the crystal optical axis PO, and investigated a configuration of the crystal plate in which the phase difference Γ caused by a linear birefringent property does not occur. In addition, the present inventors investigated an application of an optical element in which a phase difference 2ρ caused by a circular birefringent property, that is, a rotation of polarized light caused by an optical rotatory property is also suppressed to the polarization conversion device.

When an angle made by a projection optical axis in which the crystal optical axis PO of the crystal plate is projected onto a plane orthogonal to an optical axis of the incident light IL, and the polarization plane of the P-polarized light P is set as an azimuthal angle θ, in a case where the quartz crystal plate is disposed such that θ=0 (deg), the linear birefringent phase difference Γ becomes 0.

The azimuthal angle θ is fixed to 0 (deg), and an influence on a phase difference Γ' (corresponding to plate thickness yo) by 2q corresponding to an optical rotatory power is evaluated by repeating a simulation and an experiment, and is verified.

Figure 4:
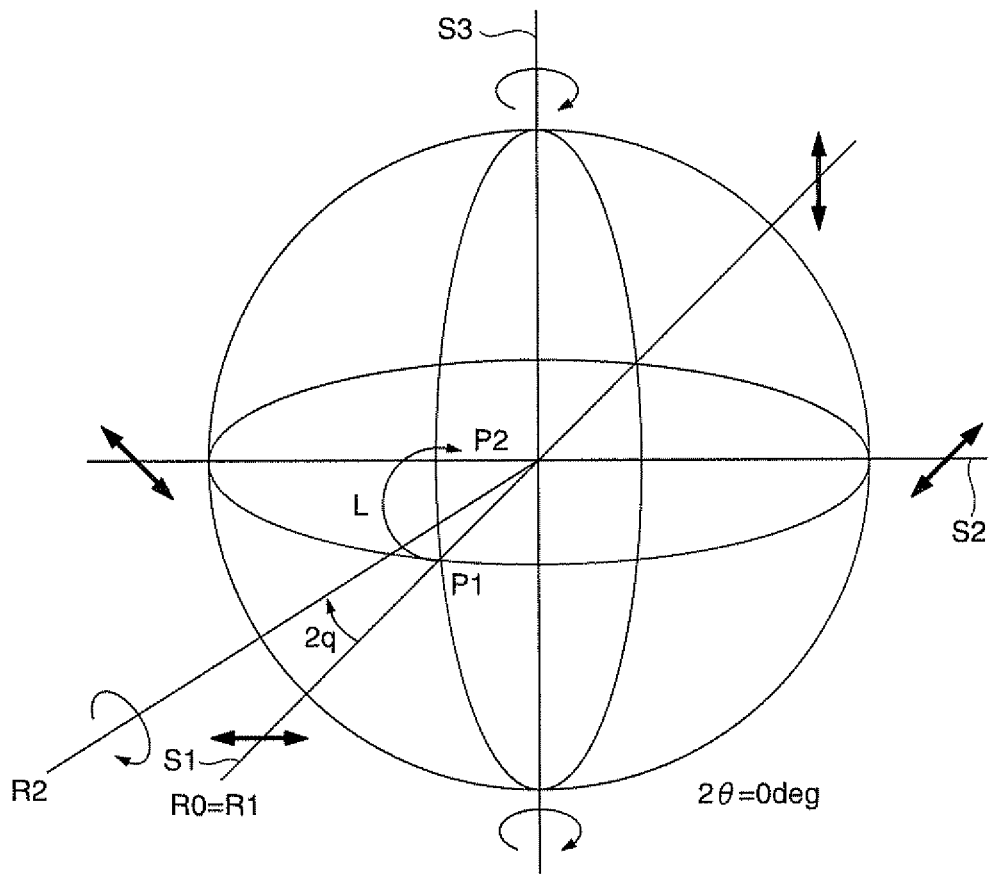
FIG. 4 is a schematic diagram illustrating a Poincare sphere that explains a principle of FIGS. 3A and 3B.

FIG. 4 shows a schematic configuration of a Poincare sphere that explains a polarization state.

In FIG. 4, first, a polarization position of the linearly polarized light P1 is set on the equator that is on an S1 axis. An R1 axis is set by rotating the S1 axis on the equator by 2θ, an R2 axis is set by raising the R1 axis by the cutting angle 2q, and the P1 becomes P2 when the R2 axis is rotated by an angle corresponding to the phase difference F. The optical axis azimuth θ, the cutting angle q, and the phase difference Γ are adjusted such that the P2 becomes a desired polarization state.

In this embodiment, the cutting angle q is defined as an angle made by the normal line PL with respect to a principal plane of the transmissive substrate 21A and the crystal optical axis PO.

For each transmissive substrate (quartz crystal plate) cut by each cutting angle, a value of Γ' operating on the incident light IL (P-polarized light) is evaluated.

$$\Gamma' = \sqrt{\Gamma^2 + (2q)^2}$$

Figure 5:
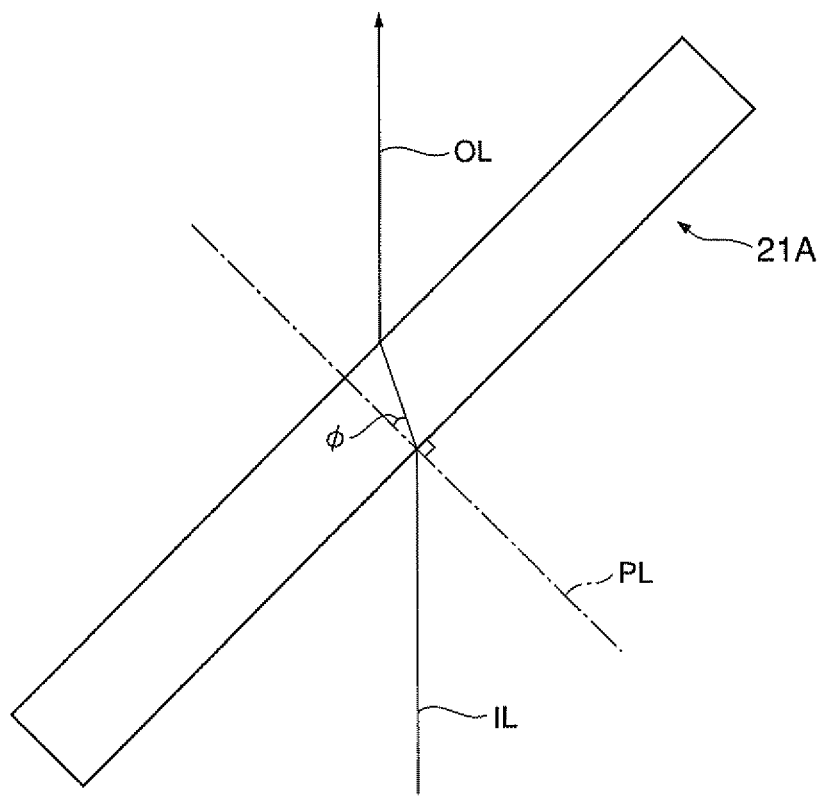
FIG. 5 is a schematic diagram illustrating a refraction angle $\phi$.

When incident to the transmissive substrate 21A, the incident light IL is refracted and propagates in the transmissive substrate 21A, and is emitted as outgoing light that is refracted in a direction parallel with an optical axis of the incident light IL when being emitted from the transmissive substrate 21A. Here, as shown in FIG. 5, when incident into the transmissive substrate 21A, the incident light IL is refracted with a refraction angle φ.

The present inventors focused on the fact that when incident into the transmissive substrate 21A and refracted, the refraction angle φ of the incident light determines an angle β made by an optical axis of light that actually propagates in the transmissive substrate 21A and the crystal optical axis PO, and according to β, the optical rotatory power 2q varies, and performed an experiment and evaluation.

A relationship between the cutting angle q and a transmission characteristic of the transmissive substrate 21A will be described.

Figure 6:
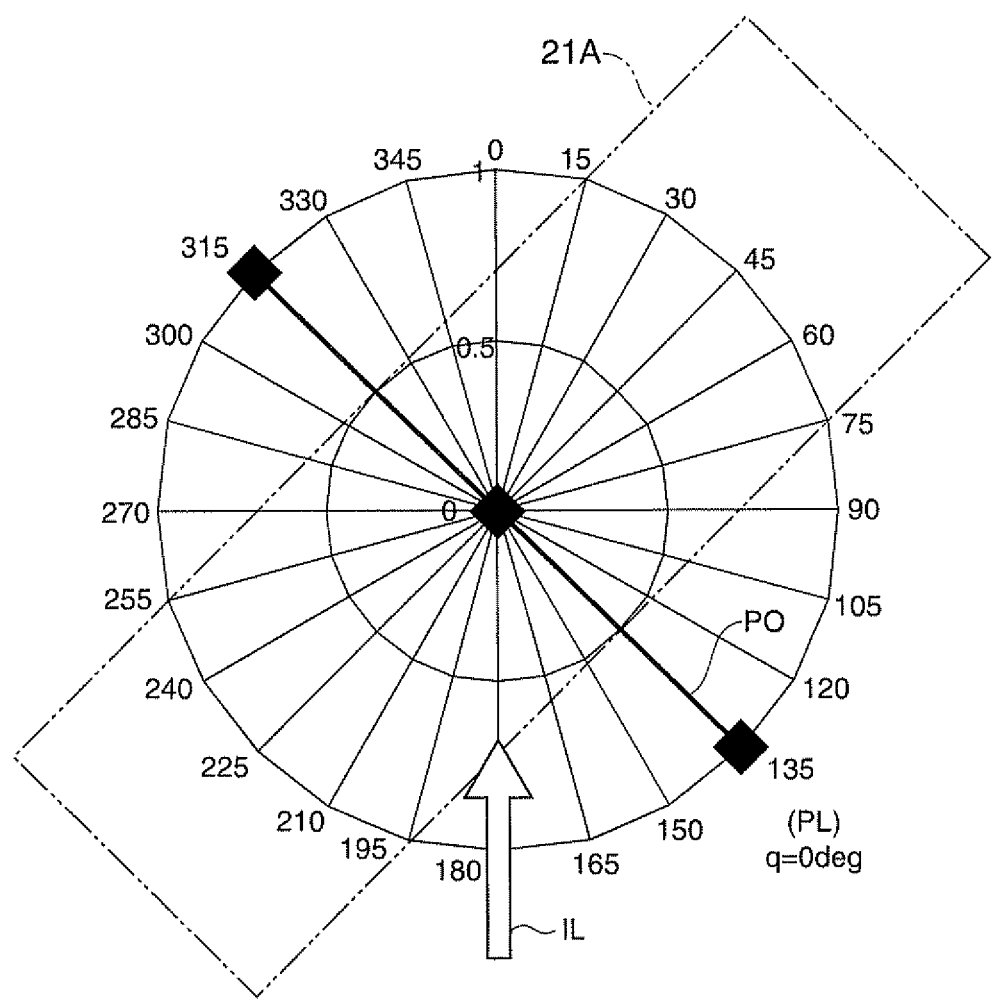
FIG. 6 is a schematic diagram illustrating transmissive substrate in a case where a cutting angle q is 0 deg.
Figure 7:
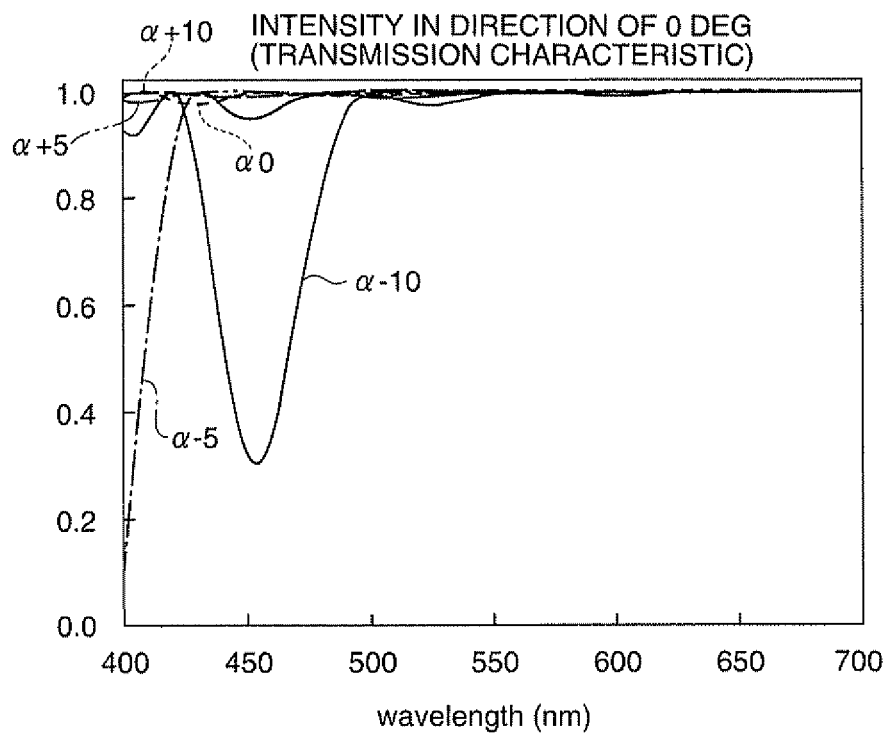
FIG. 7 is a graph illustrating intensity in the direction of 0 deg (transmission characteristic) in a case where the cutting angle q is 0 deg.

FIG. 6 shows a schematic diagram illustrating transmissive substrate in a case where the cutting angle q is 0 deg, and FIG. 7 shows a graph illustrating intensity in the direction of 0 deg as a transmission characteristic in this case. In FIG. 6, the incidence angle of the incident light IL is set to 0 deg. The transmissive substrate 21A is disposed in such a manner that a principal plane thereof is inclined at 45 deg with respect to an incidence angle, such that a normal line orthogonal to the principal plane of the transmissive substrate 21A is 135 deg. On the other hand, as is apparent from FIG. 6, the crystal optical axis PO is set to 135 deg. Therefore, in FIG. 6, the cutting angle q is 0 deg.

In FIG. 7, in a case where a divergence angle α is −10 deg, −5 deg, 0 deg, +5 deg, and +10 deg, this is illustrated as a divergence angle of α−10, α−5, α0, α+5, and α+10, respectively. This is also true for other drawings corresponding to FIG. 7.

In FIG. 7, at α0, α+5, and α+10, intensity in the direction of 0 deg (transmission characteristic) is high as a value of 0.9 or more, but at α−10 and α−5, the intensity in the direction of 0 deg is sometimes less than 0.8 depending on a wavelength.

Figure 8:
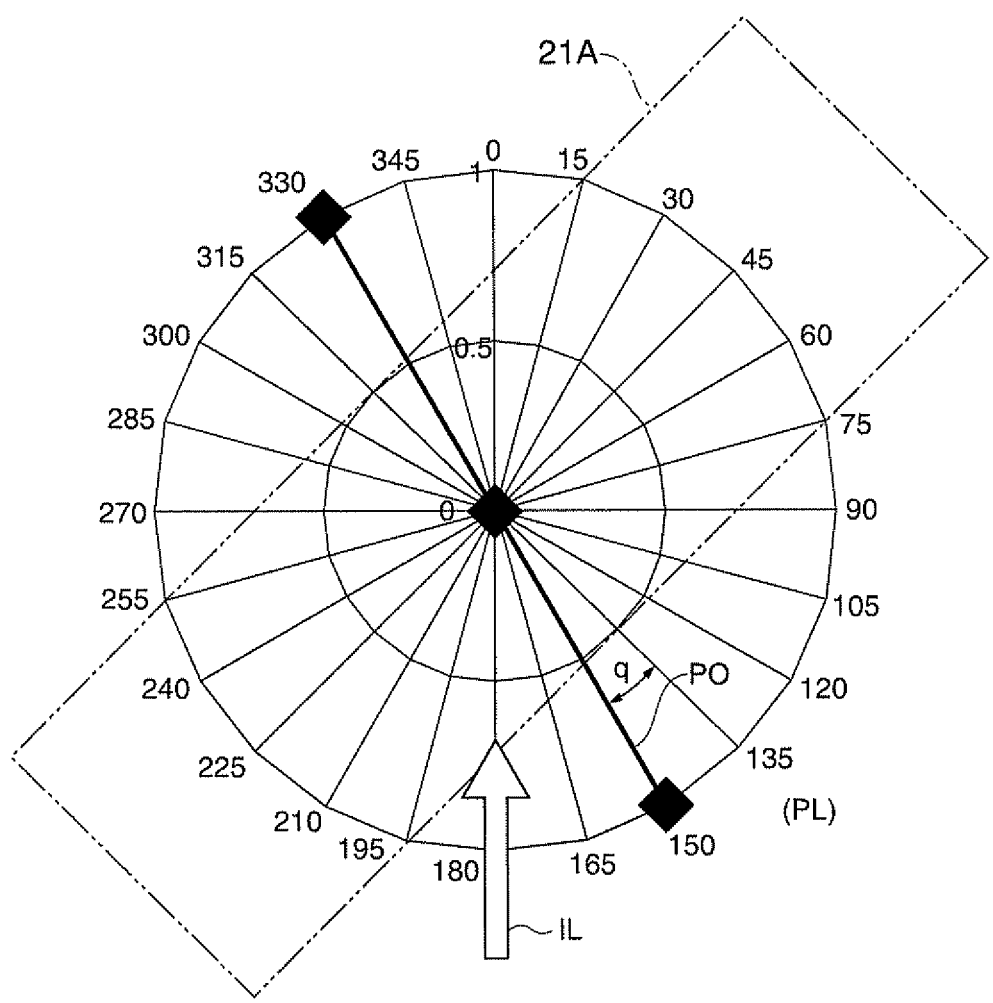
FIG. 8 is a schematic diagram of the transmissive substrate in a case where the cutting angle q is 15 deg.
Figure 9:
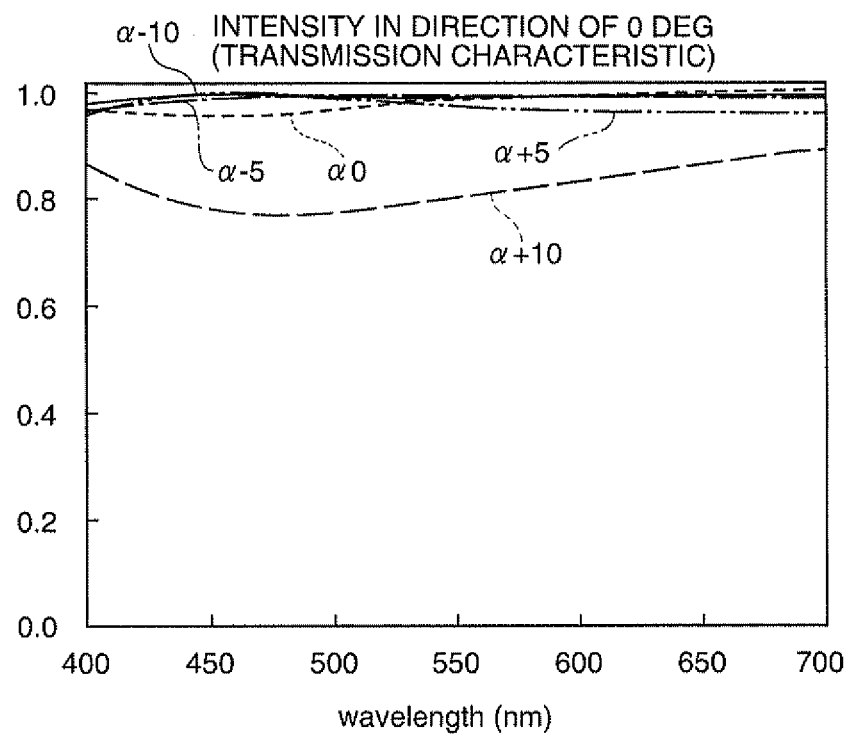
FIG. 9 is a graph illustrating intensity in the direction of 0 deg (transmission characteristic) in a case where the cutting angle q is 15 deg.

FIG. 8 shows a schematic diagram of the transmissive substrate in a case where the cutting angle q is 15 deg, and FIG. 9 shows a graph illustrating intensity in the direction of 0 deg in this case.

In FIG. 9, at α−5, α0, α+5, and α−10, the direction of 0 deg (transmission characteristic) is high as a value of 0.9 or more, but at α+10, the intensity in the direction of 0 deg is sometimes less than 0.8 depending on a wavelength.

Figure 10:
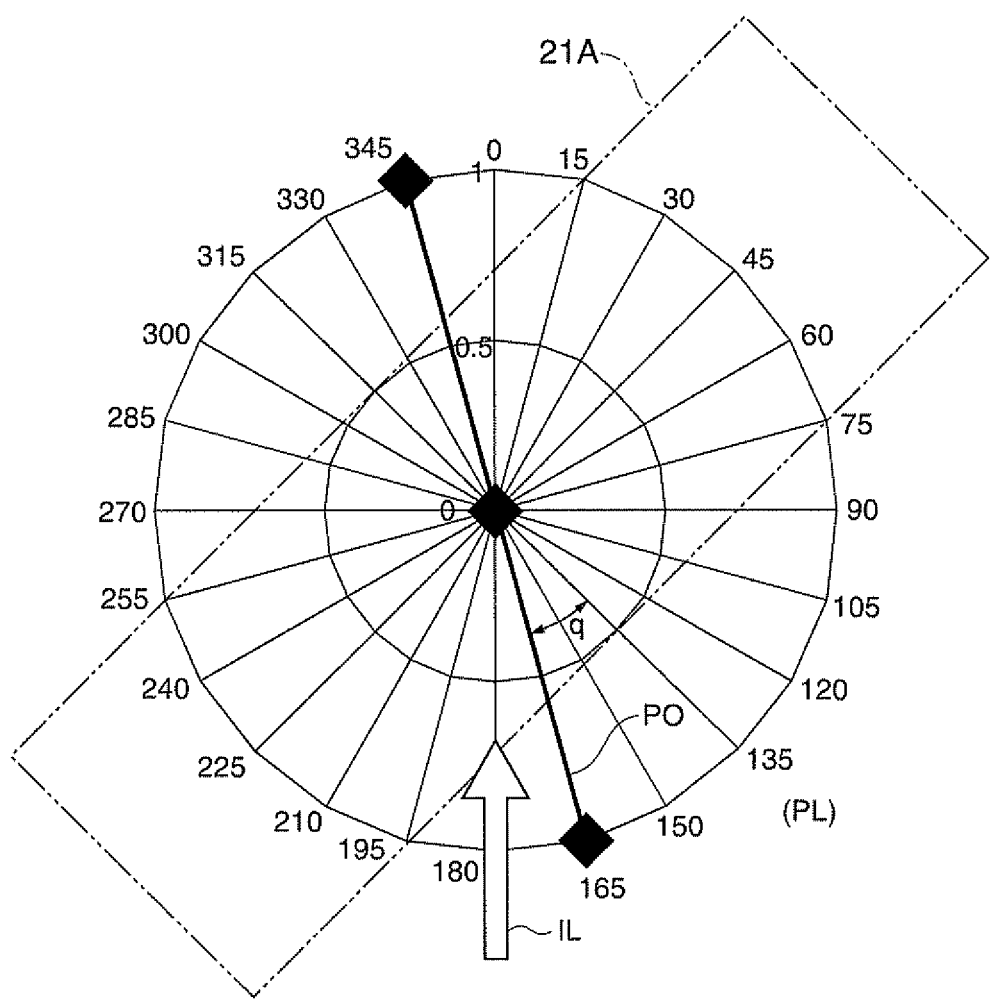
FIG. 10 is a schematic diagram of the transmissive substrate in a case where the cutting angle q is 30 deg.
Figure 11:
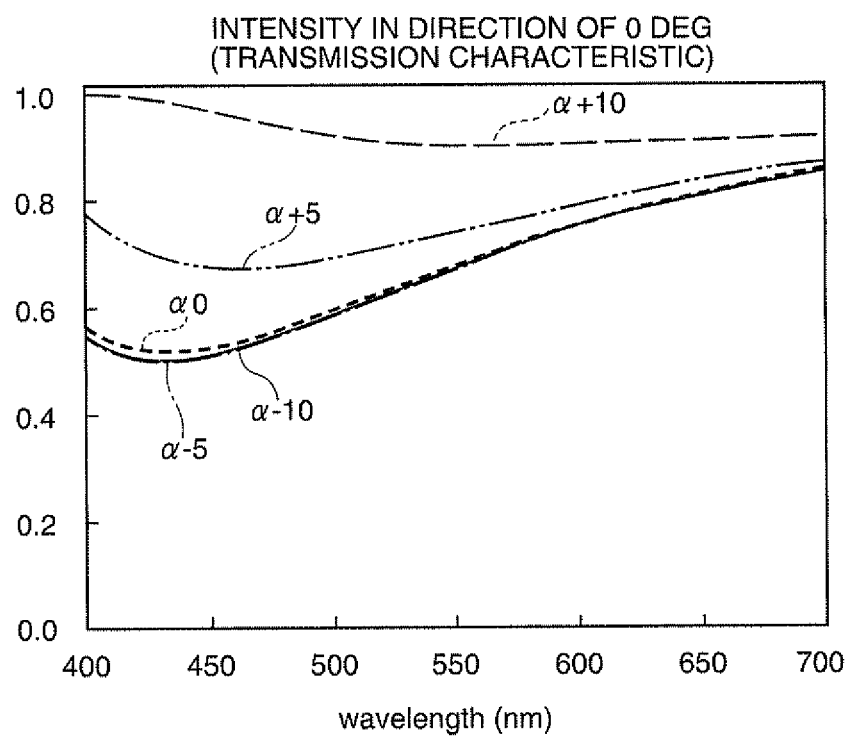
FIG. 11 is a graph illustrating intensity in the direction of 0 deg (transmission characteristic) in a case where the cutting angle q is 30 deg.

FIG. 10 shows a schematic diagram of the transmissive substrate in a case where the cutting angle q is 30 deg, and FIG. 11 shows a graph illustrating intensity in the direction of 0 deg in this case.

In FIG. 11, at α+10, the intensity in the direction of 0 deg (transmission characteristic) is high as a value of 0.9 or more, but at α−5, α0, α+5, and α−10, the intensity in the direction of 0 deg is sometimes less than 0.8 depending on a wavelength.

Figure 12:
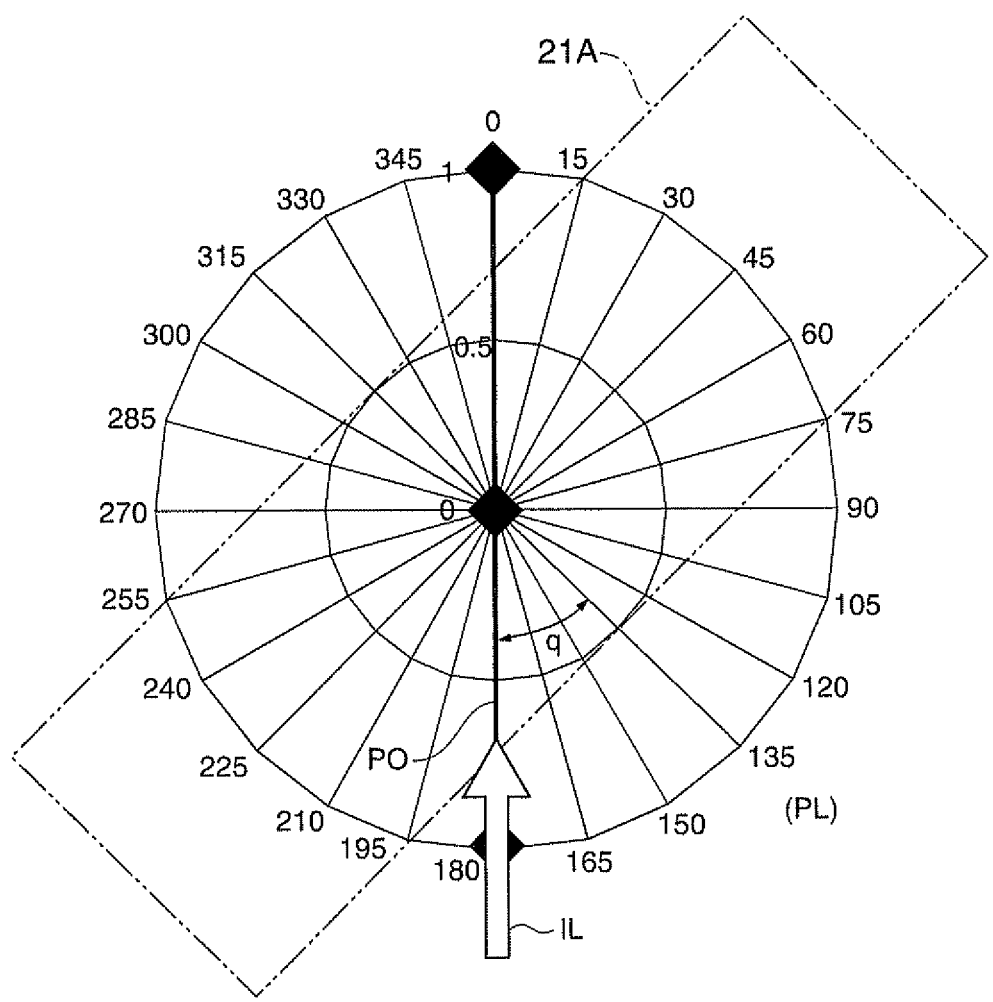
FIG. 12 is a schematic diagram of the transmissive substrate in a case where the cutting angle q is 45 deg.
Figure 13:
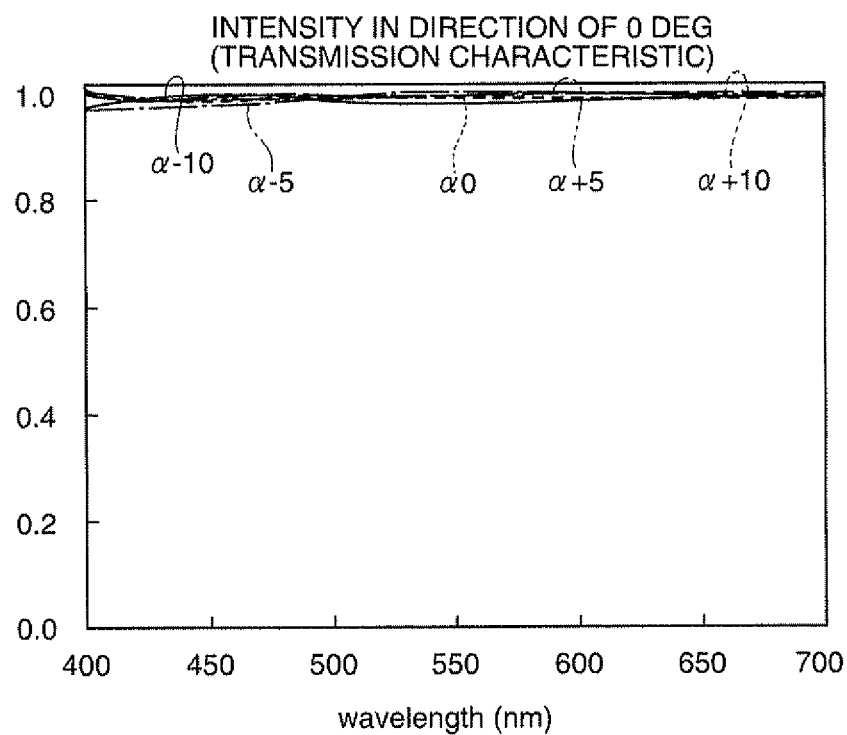
FIG. 13 is a graph illustrating intensity in the direction of 0 deg (transmission characteristic) in a case where the cutting angle q is 45 deg.

FIG. 12 shows a schematic diagram of the transmissive substrate in a case where the cutting angle q is 45 deg, and FIG. 13 shows a graph illustrating intensity in the direction of 0 deg in this case.

In FIG. 13, at all of α−10, α−5, α0, α+5, and α+10, the intensity in the direction of 0 deg is high as a value of 0.9 or more.

Figure 14:
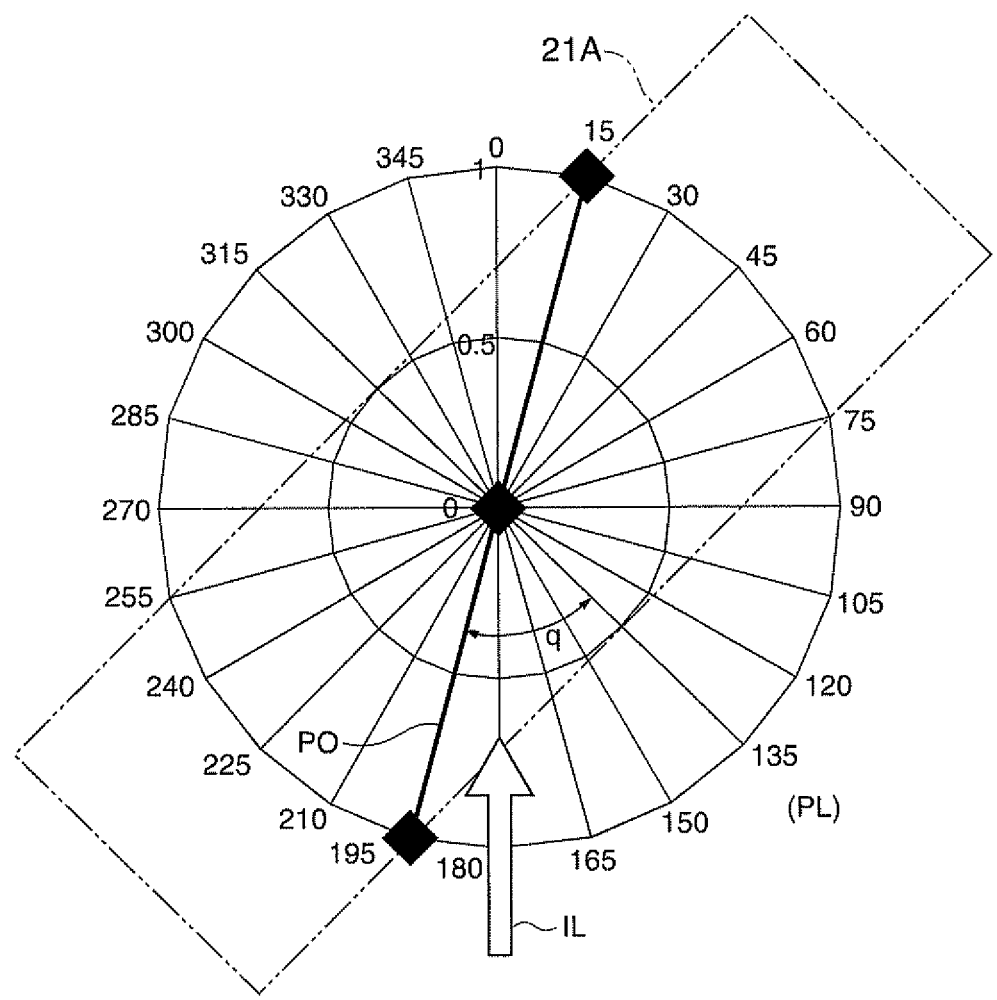
FIG. 14 is a schematic diagram of the transmissive substrate in a case where the cutting angle q is 60 deg.
Figure 15:
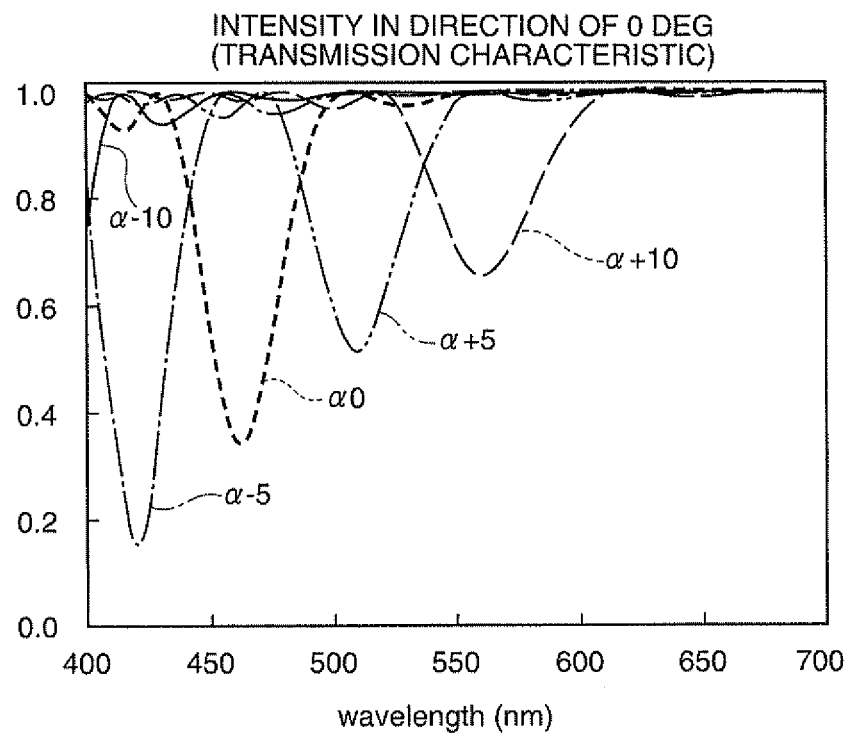
FIG. 15 is a graph illustrating intensity in the direction of 0 deg (transmission characteristic) in a case where the cutting angle q is 60 deg.

FIG. 14 shows a schematic diagram of the transmissive substrate in a case where the cutting angle q is 60 deg, and FIG. 15 shows a graph illustrating intensity in the direction of 0 deg in this case.

In FIG. 15, at all of α−10, α−5, α0, α+5, and α+10, the intensity in the direction of 0 deg is sometimes less than 0.8.

Figure 16:
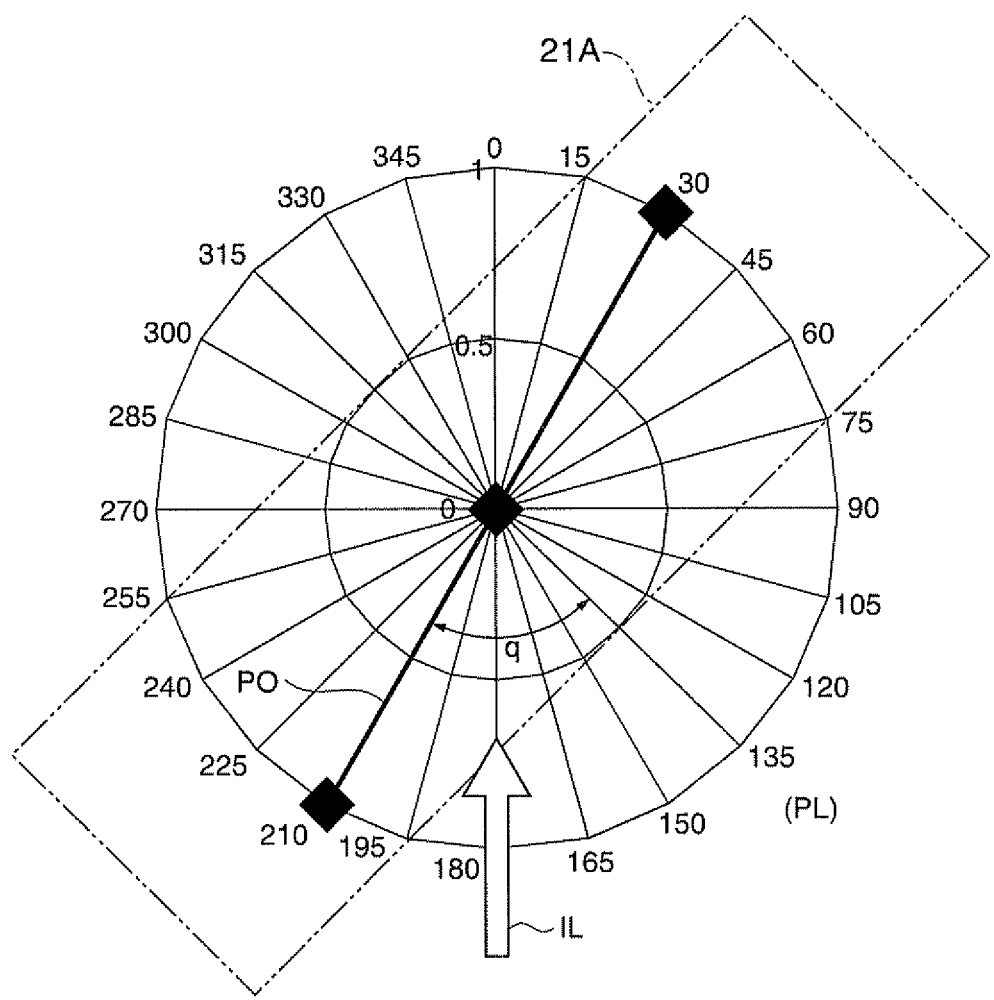
FIG. 16 is a schematic diagram of the transmissive substrate in a case where the cutting angle q is 75 deg.
Figure 17:
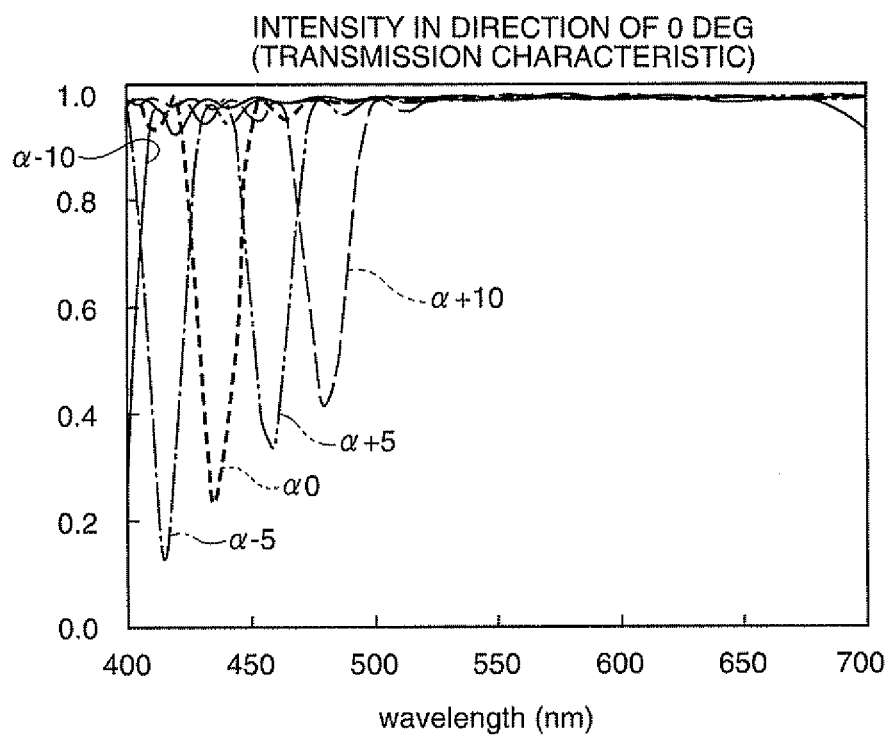
FIG. 17 is a graph illustrating intensity in the direction of 0 deg (transmission characteristic) in a case where the cutting angle q is 75 deg.

FIG. 16 shows a schematic diagram of the transmissive substrate in a case where the cutting angle q is 75 deg, and FIG. 17 shows a graph illustrating intensity in the direction of 0 deg in this case.

In FIG. 17, at all of α−10, α−5, α0, α+5, and α+10, the intensity in the direction of 0 deg is sometimes less than 0.8.

Figure 18:
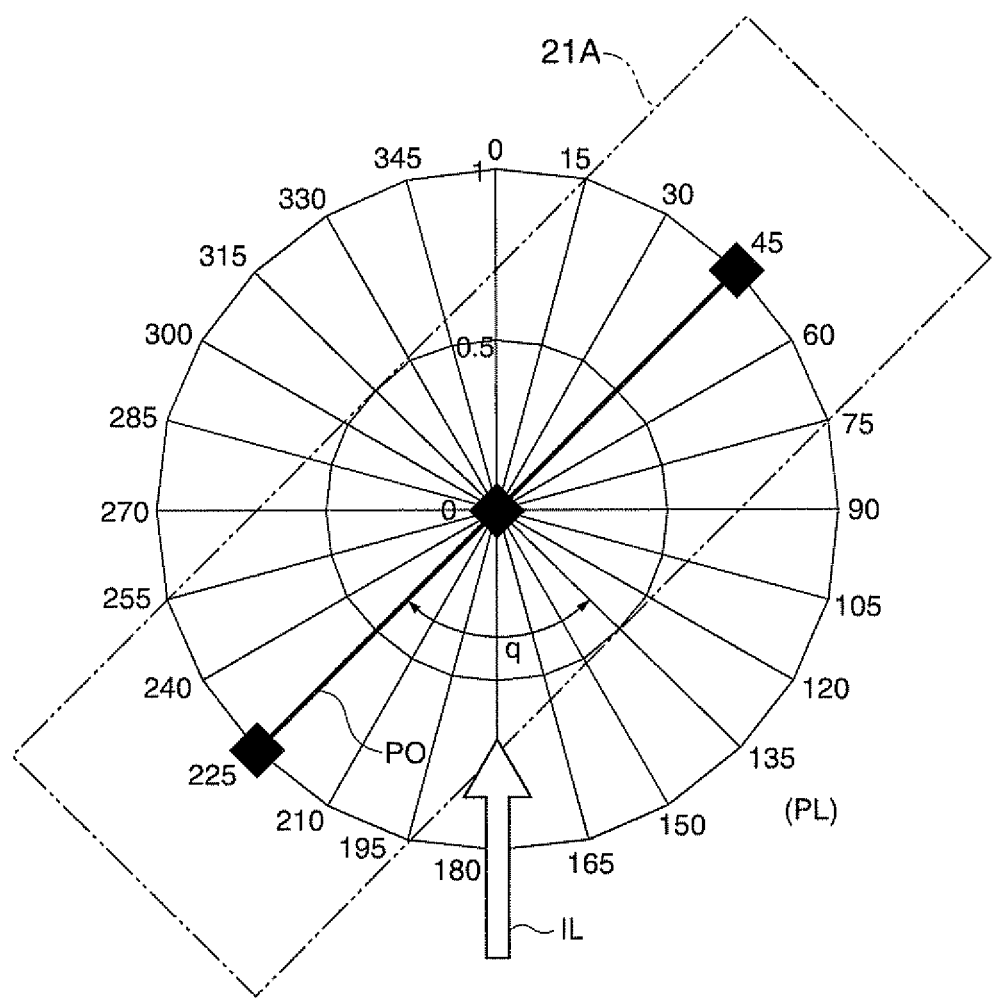
FIG. 18 is a schematic diagram of the transmissive substrate in a case where the cutting angle q is 90 deg.
Figure 19:
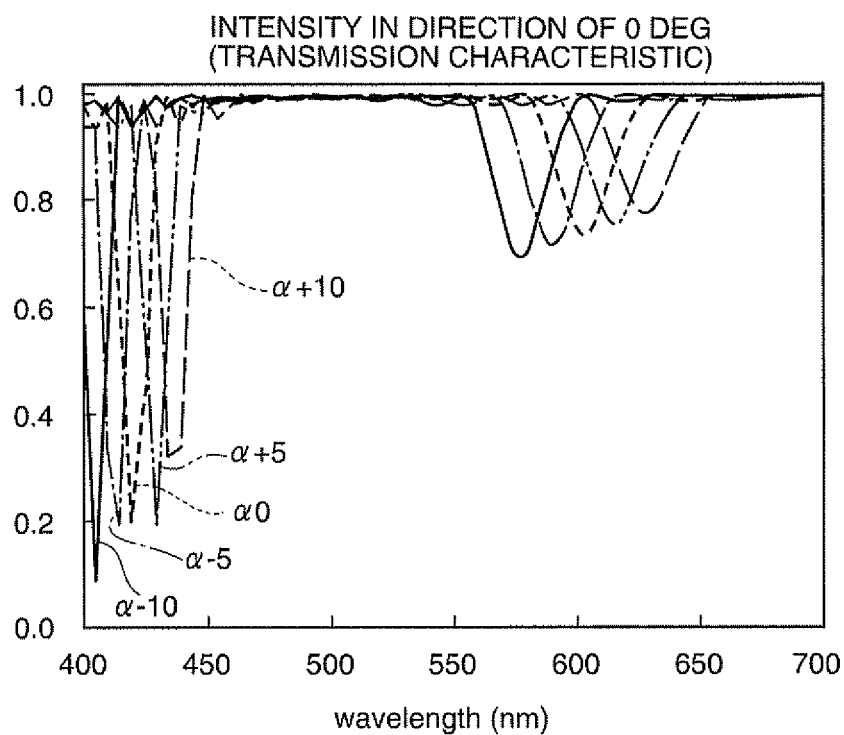
FIG. 19 is a graph illustrating intensity in the direction of 0 deg (transmission characteristic) in a case where the cutting angle q is 90 deg.

FIG. 18 shows a schematic diagram of the transmissive substrate in a case where the cutting angle q is 90 deg, and FIG. 19 shows a graph illustrating intensity in the direction of 0 deg in this case.

In FIG. 19, at all of α−10, α−5, α0, α+5, and α+10, the intensity in the direction of 0 deg is sometimes less than 0.8.

Figure 20:
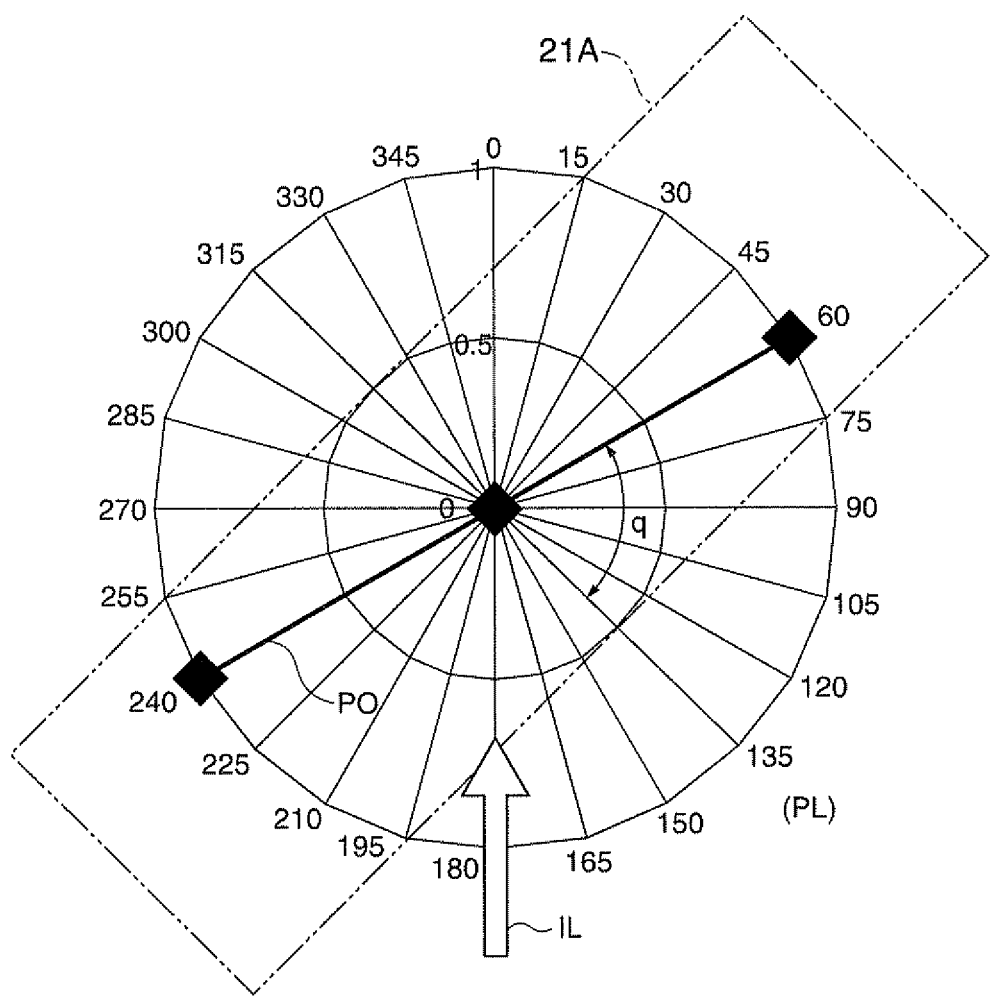
FIG. 20 is a schematic diagram of the transmissive substrate in a case where the cutting angle q is 105 deg.
Figure 21:
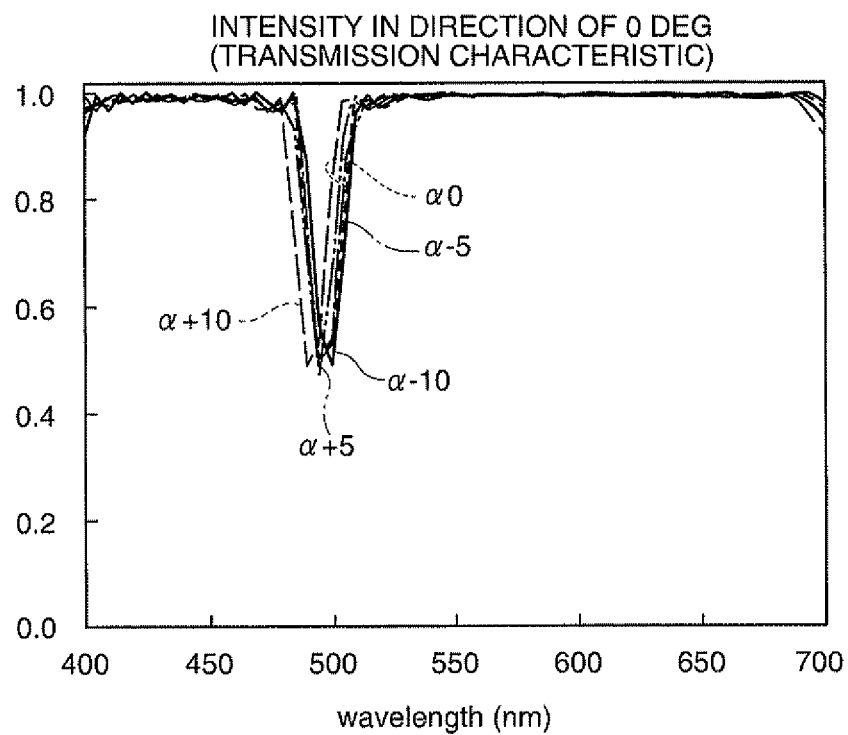
FIG. 21 is a graph illustrating intensity in the direction of 0 deg (transmission characteristic) in a case where the cutting angle q is 105 deg.

FIG. 20 shows a schematic diagram of the transmissive substrate in a case where the cutting angle q is −75 deg, and FIG. 21 shows a graph illustrating intensity in the direction of 0 deg.

In FIG. 21, at all of α−10, α−5, α0, α+5, and α+10, the intensity in the direction of 0 deg is sometimes less than 0.8.

Figure 22:
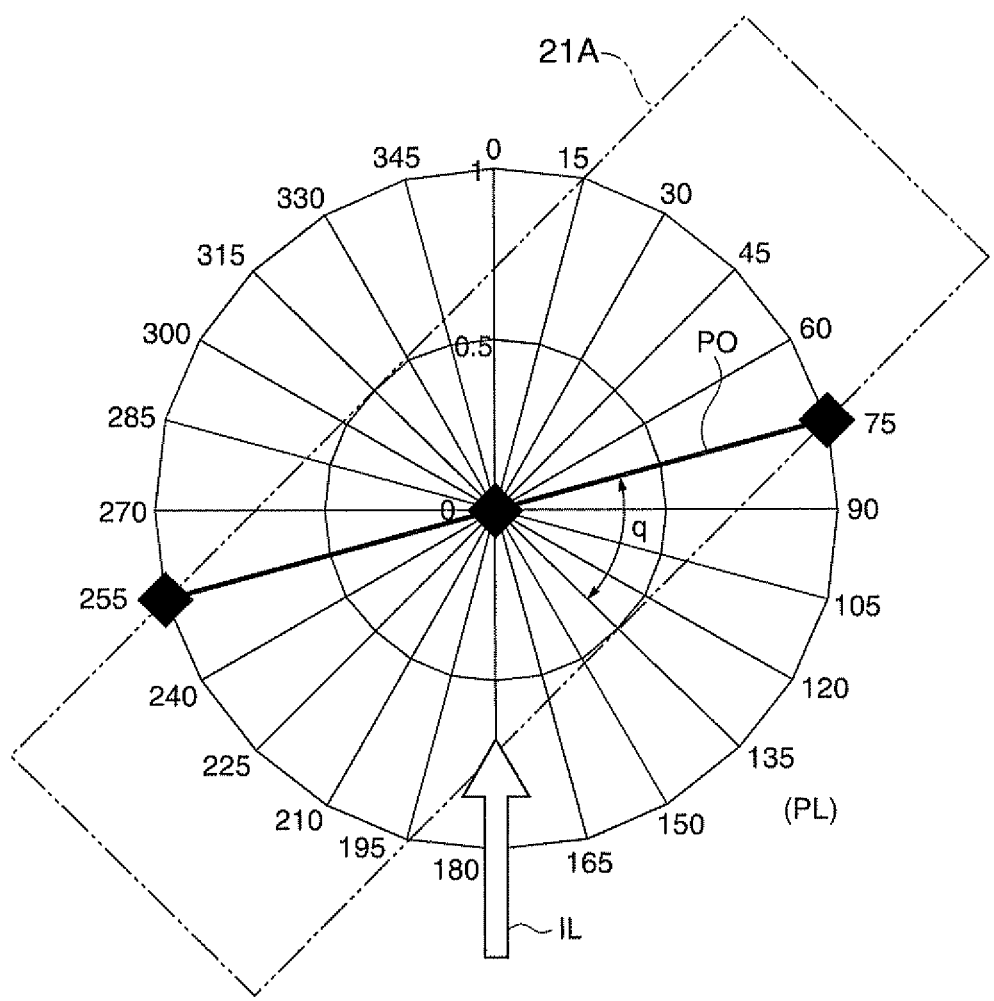
FIG. 22 is a schematic diagram of the transmissive substrate in a case where the cutting angle q is 120 deg.
Figure 23:
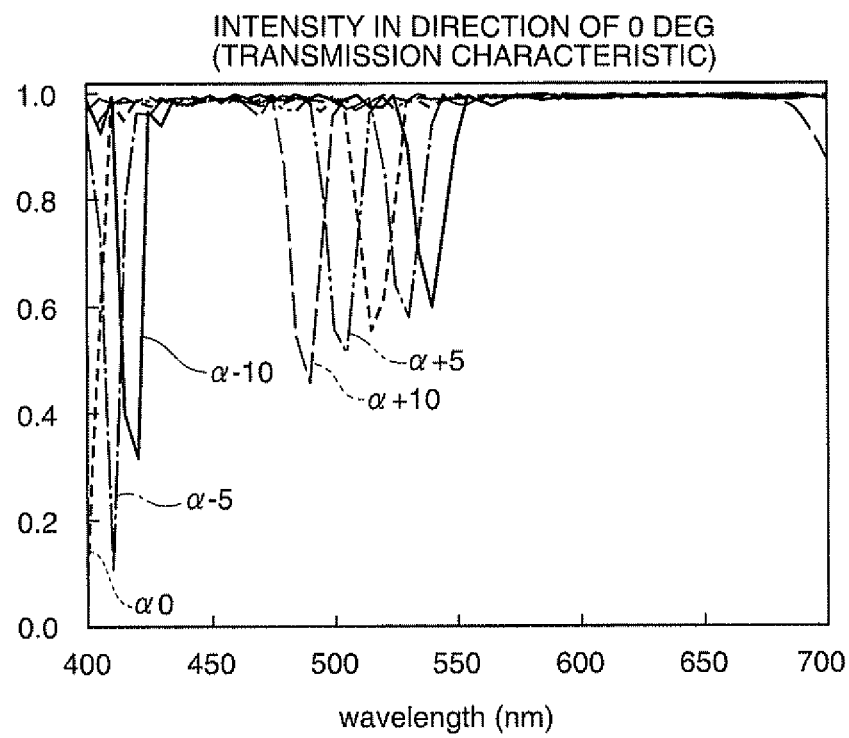
FIG. 23 is a graph illustrating intensity in the direction of 0 deg (transmission characteristic) in a case where the cutting angle q is 120 deg.

FIG. 22 shows a schematic diagram of the transmissive substrate in a case where the cutting angle q is −60 deg, and FIG. 23 shows a graph illustrating intensity in the direction of 0 deg in this case.

In FIG. 23, at all of α−10, α−5, α0, α+5, and α+10, the intensity in the direction of 0 deg is sometimes less than 0.8.

Figure 24:
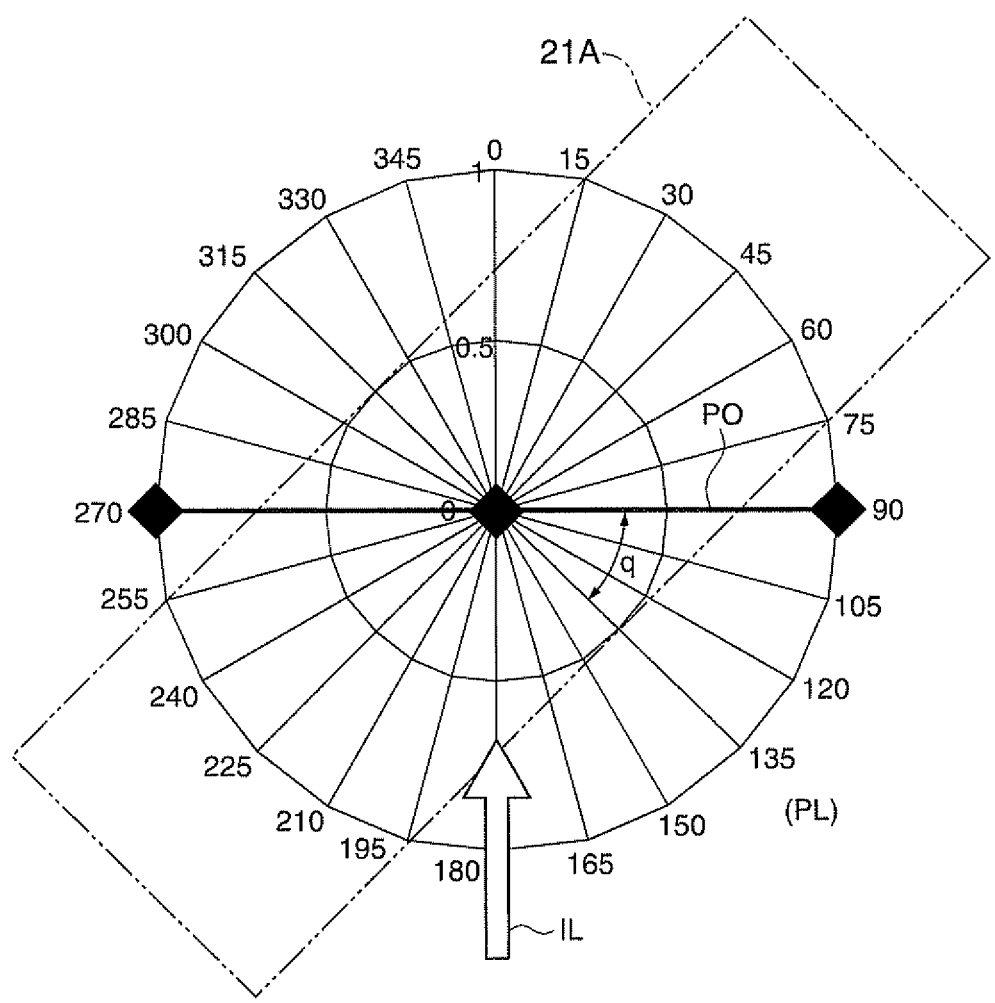
FIG. 24 is a schematic diagram of the transmissive substrate in a case where the cutting angle q is 135 deg.
Figure 25:
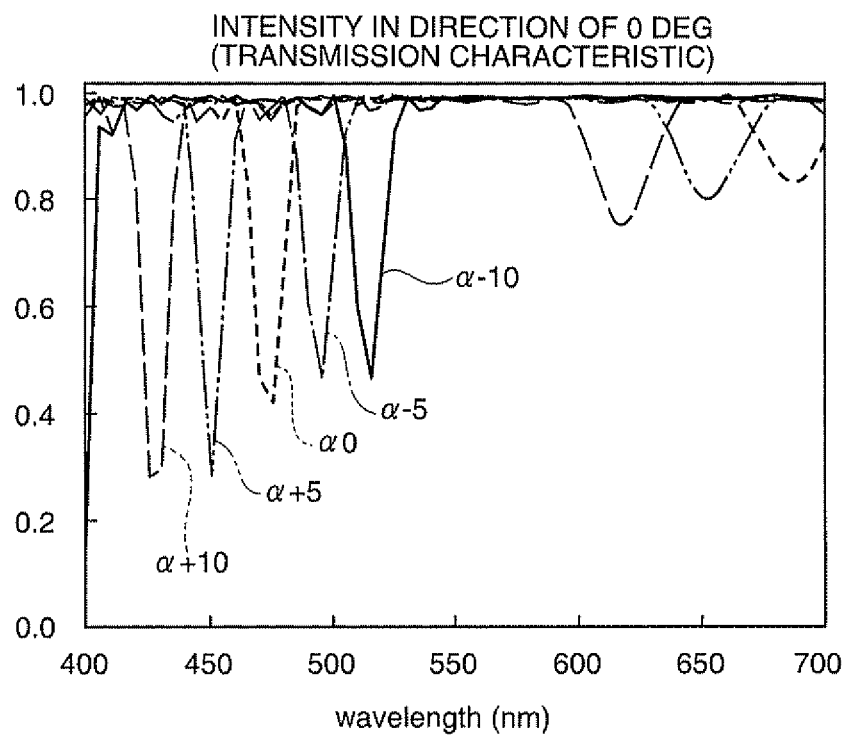
FIG. 25 is a graph illustrating intensity in the direction of 0 deg (transmission characteristic) in a case where the cutting angle q is 135 deg.

FIG. 24 shows a schematic diagram of the transmissive substrate in a case where the cutting angle q is −45 deg, and FIG. 25 shows a graph illustrating intensity in the direction of 0 deg in this case.

In FIG. 25, at all of α−10, α−5, α0, α+5, α+10, the intensity in the direction of 0 deg is sometimes less than 0.8.

Figure 26:
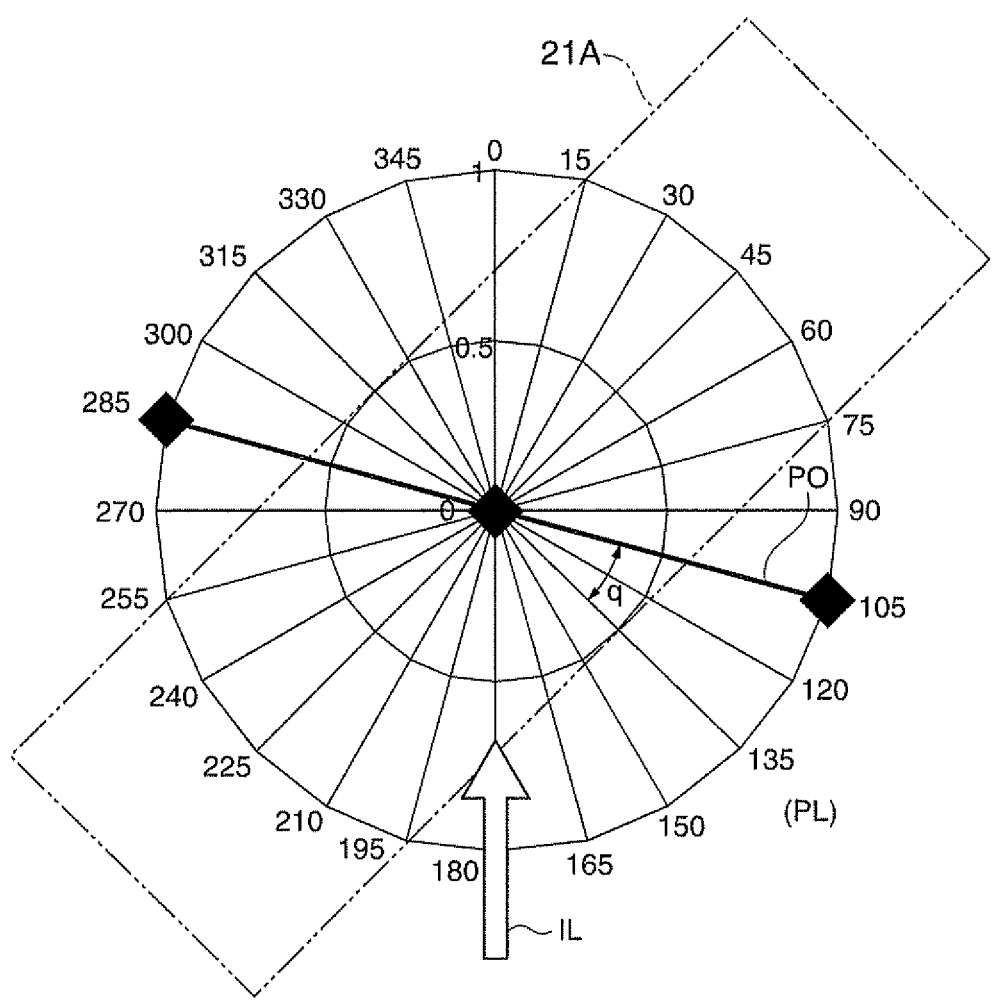
FIG. 26 is a schematic diagram of the transmissive substrate in a case where the cutting angle q is 150 deg.
Figure 27:
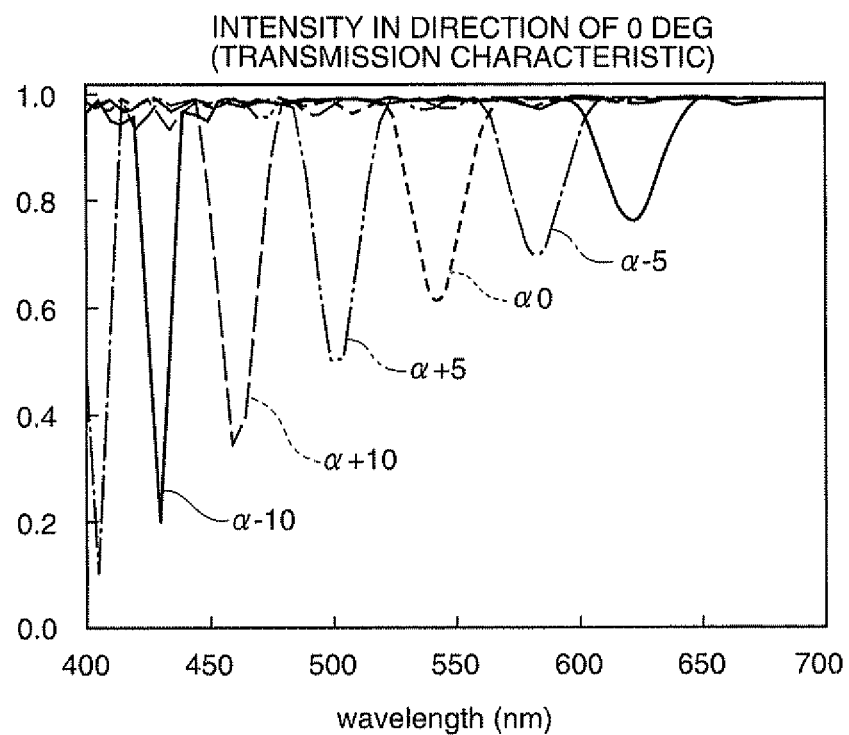
FIG. 27 is a graph illustrating intensity in the direction of 0 deg (transmission characteristic) in a case where the cutting angle q is 150 deg.

FIG. 26 shows a schematic diagram of the transmissive substrate in a case where the cutting angle q is −30 deg, and FIG. 27 shows a graph illustrating intensity in the direction of 0 deg in this case.

In FIG. 27, at all of α−10, α−5, α0, α+5, and α+10, the intensity in the direction of 0 deg is sometimes less than 0.8.

Figure 28:
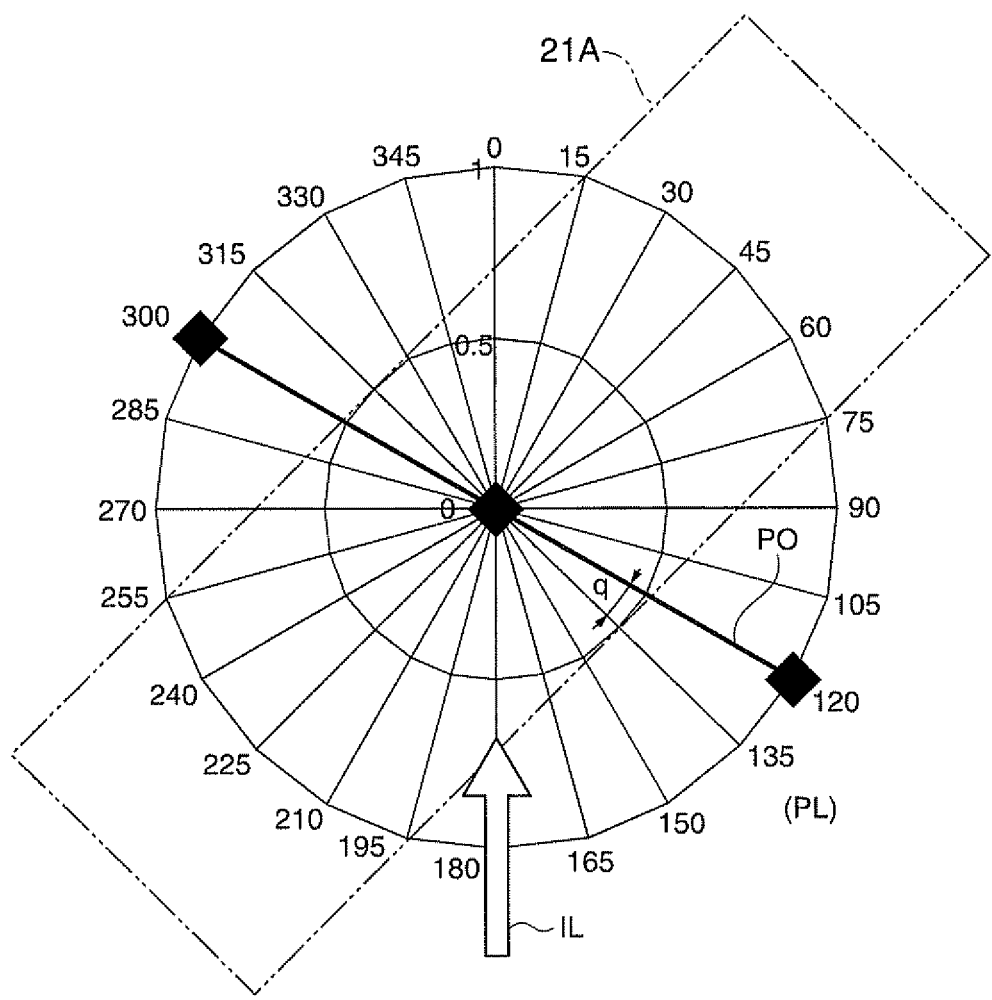
FIG. 28 is a schematic diagram of the transmissive substrate in a case where the cutting angle q is 165 deg.
Figure 29:
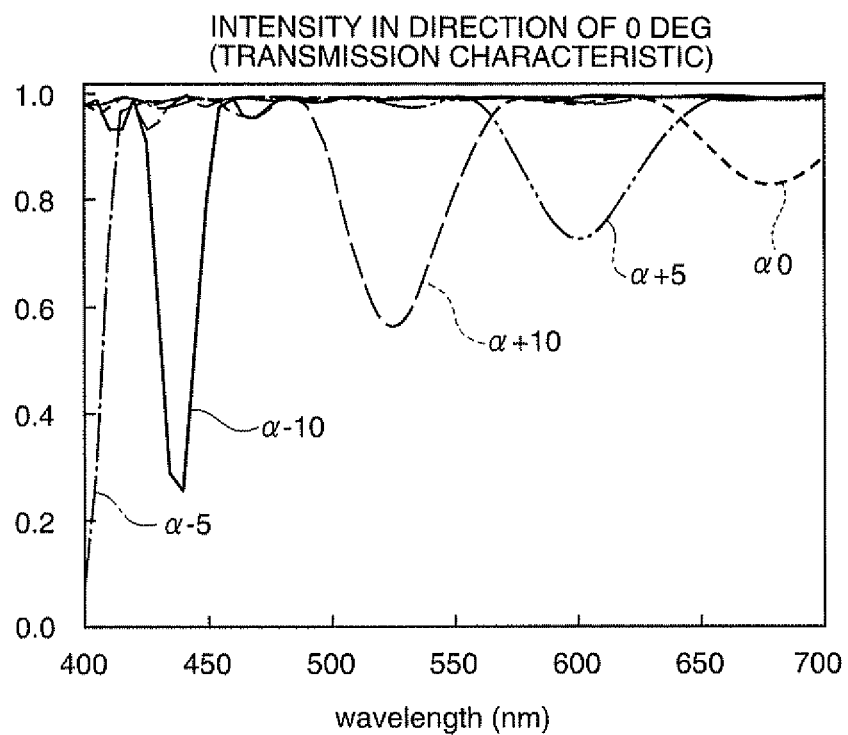
FIG. 29 is a graph illustrating intensity in the direction of 0 deg (transmission characteristic) in a case where the cutting angle q is 165 deg.

FIG. 28 is a schematic diagram of the transmissive substrate in a case where the cutting angle q is −15 deg, and FIG. 29 is a graph illustrating intensity in the direction of 0 deg in this case.

In FIG. 29, at α−10, α−5, α+5, and α+10, the intensity in the direction of 0 deg is sometimes less than 0.8.

Figure 30:
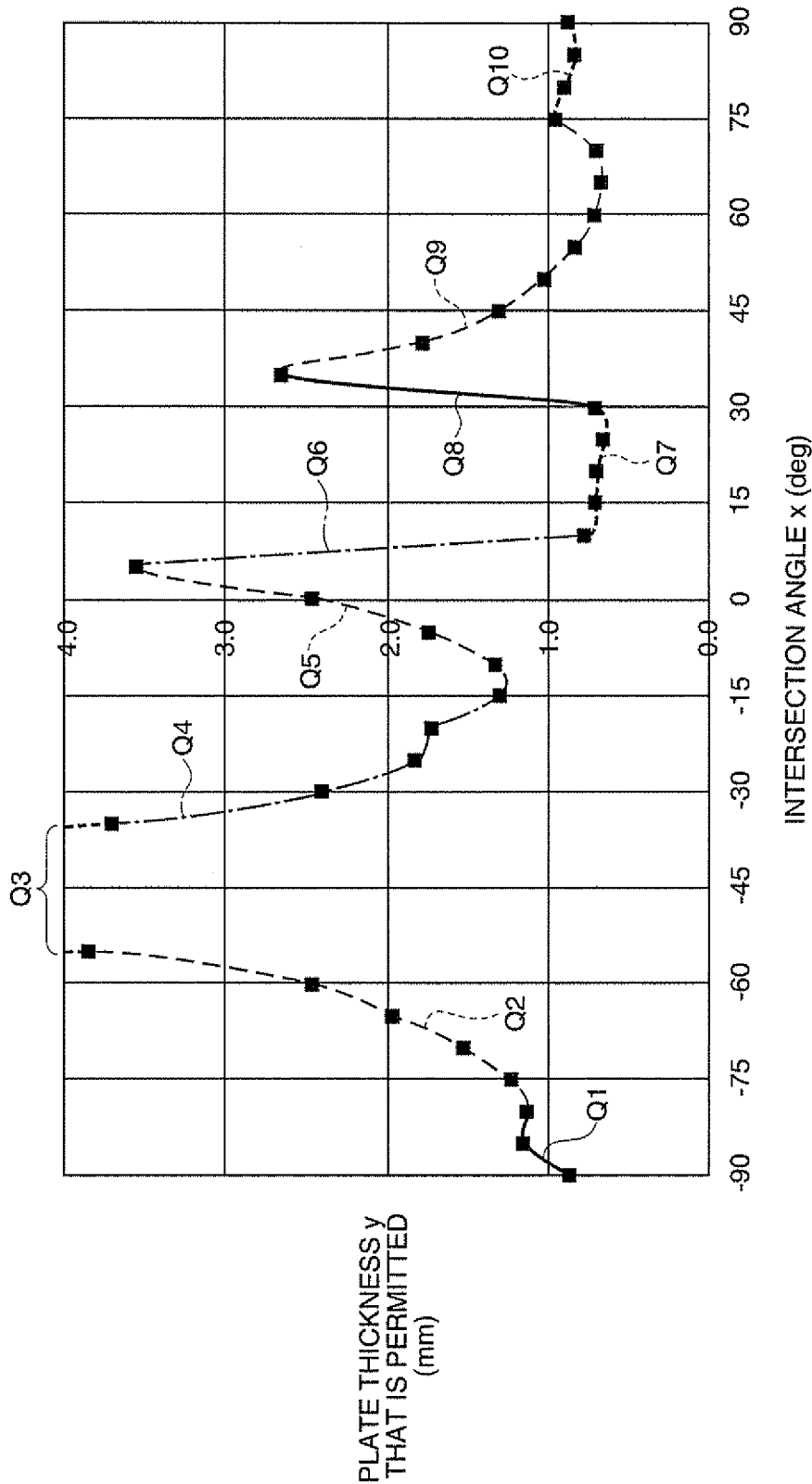
FIG. 30 is a graph illustrating a relationship between an intersection angle x and a maximum value y of the plate thickness yo that is permitted.

From the above-described relationships, a relationship between the intersection angle x and the maximum value y of the plate thickness yo that is permitted is obtained. The relationship between the intersection angle x and the maximum value y of the plate thickness yo that is permitted is shown in FIG. 30. Here, the maximum value y of the plate thickness yo that is permitted is a plate thickness in which in a range of all diverging light (α is ±10 deg), the polarization conversion efficiency (intensity in the direction of 0 deg) becomes 0.8 or more.

In addition, an axis, which is taken in a direction orthogonal to a plane including the crystal optical axis PO and the optical axis of the incident light IL at an intersection point of the crystal optical axis PO of the transmissive substrate 21A and the optical axis of the incident light IL, is set as a central axis, and when seen from a direction orthogonal to the plane including the crystal optical axis PO and the optical axis of the incident light IL, a counterclockwise direction of the central axis is set as a positive side, the intersection angle x satisfies a relationship of −90 (deg)≤x≤+90 (deg).

In FIG. 30, in a case where the intersection angle x satisfies a relationship of −90 deg<x≤−80 deg (area Q1), the maximum value y in the plate thickness yo of the transmissive substrate 21A is obtained by the following equation (1).

$$y = -0.0058x^2 - 0.9672x - 38.858 \text{ (mm)} \quad (1)$$

Here, when the intersection angle x is −90 deg, y is 0.8653 mm, and when the intersection angle x is −80 deg, y is 1.1257 mm, such that in a range of the area Q1, a relationship of 0.8653 mm<y≤1.1257 mm is satisfied.

Figure 31A:
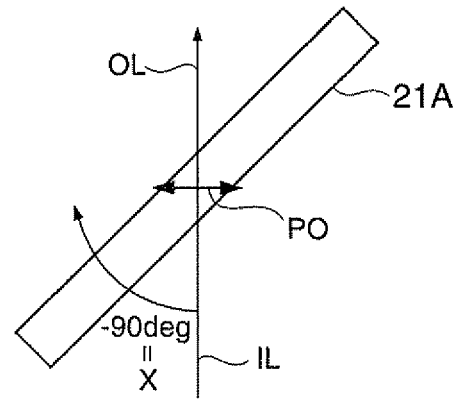
FIG. 31A is a schematic diagram illustrating a state where the intersection angle x is −90 deg.

In addition, FIG. 31A illustrates a state where the intersection angle x is −90 deg.

In a case where the intersection angle x satisfies a relationship of −80 (deg)<x≤−55 (deg) (area Q2), the maximum value y in the plate thickness yo of the transmissive substrate 21A is obtained from the following equation (2).

$$y = 2 \times 10^{-6} x^5 + 0.0008 x^4 + 0.1145 x^3 + 7.9738 x^2 + 276.92 x + 3842.1 \text{ (mm)} \quad (2)$$

Here, when the intersection angle x is −80 deg, y is 1.1257 mm, and when the intersection angle x is −55 deg, y is 3.8506 mm, such that in a range of the area Q2, a relationship of 1.1257 mm<y≤3.8506 mm is satisfied.

In a case where the intersection angle x satisfies a relationship of −55 deg<x≤−35 deg (area Q3) the maximum value y in the plate thickness yo of the transmissive substrate 21A satisfies a relationship of, 3.7 (mm)≤y. That is, it is free as long as the maximum value y of the plate thickness yo that is permitted is 3.7 mm or more.

Figure 31B:
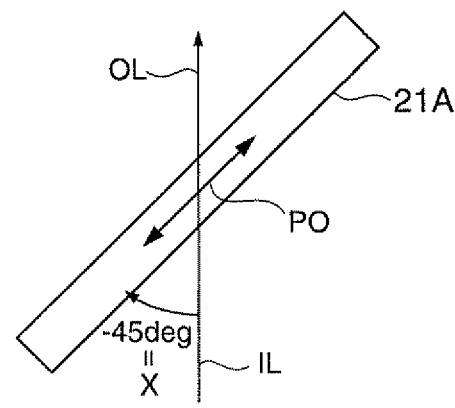
FIG. 31B is a schematic diagram illustrating a state where the intersection angle x is −45 deg.

In addition, FIG. 31B illustrates a state where the intersection angle x is −45 deg.

In a case where the intersection angle x satisfies a relationship of −35 deg<x≤−15 deg (area Q4), the maximum value y in the plate thickness yo of the transmissive substrate 21A is obtained from the following equation (3).

$$y = -4 \times 10^{-5} x^4 - 0.0045 x^3 - 0.1828 x^2 - 3.1831 x - 18.449 \quad (3)$$

Here, when the intersection angle x is −35 deg, y is 3.7030 mm, and when the intersection angle x is −15 deg, y is 1.2999 mm, such that in a range of the area Q4, a relationship of 3.7030 mm<y≤1.2999 mm is satisfied.

In a case where the intersection angle x satisfies a relationship of −15 deg<x≤+5 deg (area Q5), the maximum value y in the plate thickness yo of the transmissive substrate 21A is obtained from the following equation (4).

$$y = 9 \times 10^{-6} x^4 + 0.0002 x^3 + 0.0071 x^2 + 0.1786 x + 2.4607 \quad (4)$$

Here, when the intersection angle x is −15 deg, y is 1.2999 mm, and when the intersection angle x is +5 deg, y is 3.5554 mm, such that in a range of the area Q6, a relationship of 1.2999 mm<y≤3.5554 mm is satisfied.

Figure 31C:
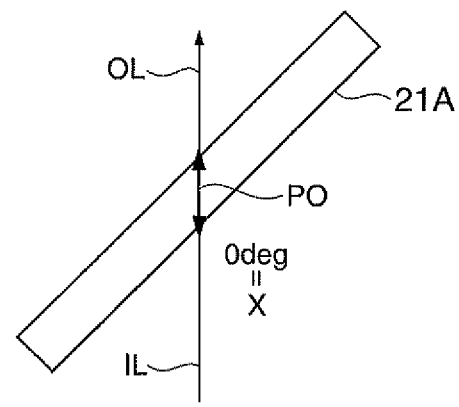
FIG. 31C is a schematic diagram illustrating a state where the intersection angle x is 0 deg.

In addition, FIG. 31C illustrates a state where the intersection angle x is 0 deg.

In a case where the intersection angle x satisfies a relationship of +5 deg<x≤+10 deg (area Q6), the plate thickness y of the transmissive substrate 21A is obtained from the following equation (5).

$$y=-0.5597x+6.3541 \quad (5)$$

Here, when the intersection angle x is +5 deg, y is 3.5554 mm, and when the intersection angle x is +10 deg, y is 0.7566 mm, such that in a range of area Q6, 0.7566 mm≤y<3.5554 mm is satisfied.

When the intersection angle x satisfies a relationship of +10 deg<x≤+30 deg (area Q7), the plate thickness y of the transmissive substrate 21A is obtained from the following equation (6).

$$y=1\times10^{-5}x^4-0.0008x^3-0.0224x^2-0.2833x+2.0276 \quad (6)$$

Here, when the intersection angle x is +10 deg, y is 0.7566 mm, and when the intersection angle x is +30 deg, y is 0.7016 mm, such that in a range of the area Q7, a relationship of 0.7016 mm≤y<0.7566 mm is satisfied.

In a case where the intersection angle x satisfies a range of +30 deg<x≤+35 deg (area Q8), the plate thickness y of the transmissive substrate 21A is obtained from the following equation (7).

$$y=0.3878x-10.931 \quad (7)$$

Here, when the intersection angle x is +30 deg, y is 0.7016 mm, and when the intersection angle x is +35 deg, y is 2.6404 mm, such that in a range of area Q8, a relationship of 0.7016 mm≤y<2.6404 mm is satisfied.

In a case where the intersection angle x satisfies a relationship of +35 deg<x≤+75 deg (area Q9), the plate thickness y of the transmissive substrate 21A is obtained from the following equation (8).

$$y=5\times10^{-9}x^6-2\times10^{-6}x^5+0.0002x^4-0.0176x^3+0.7441x^2-16.972x+165.72 \quad (8)$$

Here, when the intersection angle x is +35 deg, y is 2.6404 mm, when the intersection angle x is +70 deg, y is 0.6906 mm, and the intersection angle x is +75 deg, y is 0.9520 mm, such that in a range of the area Q9, a relationship of 0.6906 mm≤y≤2.6404 mm is satisfied.

In a case where the intersection angle x satisfies a relationship of +75 deg<x<+90 deg (area Q10), the plate thickness y of the transmissive substrate 21A is obtained from the following equation (9).

$$y=9\times10^{-5}x^3-0.0215x^2+1.6761x-42.176 \quad (9)$$

Here, when the intersection angle x is +75 deg, y is 0.9520 mm, and when the intersection angle x is +85 deg, y is 0.8284 mm, and when the intersection angle x is +90 deg, y is 0.8653 mm, such that in the area Q10, a relationship of 0.8284 mm≤y≤0.9520 mm is satisfied.

In the first embodiment configured as described above, the following operational effect may be obtained.

(1) The polarization separation device 21 includes the transmissive substrate 21A formed of the crystalline material having the birefringent property and optical rotatory property, and the polarization separation portion 21B that is provided at the incidence-side surface of the transmissive substrate 21A and that transmits the P-polarized light and reflects the S-polarized light. The reflective element 22, which reflects the S-polarized light S reflected by the polarization separation portion 21B, is disposed substantially in parallel with the transmissive substrate 21A, and the phase difference plate 23 is disposed at the emission-side of the transmissive substrate 21A. The P-polarized light P, which is transmitted through the polarization separation portion 21B and is incident to the transmissive substrate 21A, is emitted from the emission-side surface of the transmissive substrate 21A while maintaining the polarization plane as it is. The phase difference plate 23 converts the polarization plane of the P-polarized light P that transmits through the transmissive substrate 21A so as to be parallel with the polarization plane of the S-polarized light S and emits it as the S-polarized light S. Therefore, a lens array includes the polarization separation device 21 and the reflective element 22, such that a transparent member that is formed of glass or the like and that is disposed between the polarization separation device 21 and the reflective element 22 is not necessary, and as a result, a structure becomes compact. Furthermore, as the transmissive substrate 21A, a crystalline material is used, and this crystalline material has a high heat dissipation effect compared to glass, such that the heat resistance and long operating life may be realized. Here, in this embodiment, as the transmissive substrate 21A, a crystalline material having the birefringent property and optical rotatory property is used, such that there is a concern that a polarization state may vary and thereby a polarization conversion efficiency may decrease, but since the P-polarized light P, which is transmitted through the polarization separation portion 21B and is incident to the transmissive substrate 21A, is emitted from the emission-side surface of the transmissive substrate 21A while maintaining the polarization plane as it is, it is possible to remove the variation in the polarization state and therefore it is possible to obtain a good optical characteristic.

(2) Since the transmissive substrate 21A is disposed at 45 (deg) or 135 (deg) with respect to the incident light IL, it is possible to reflect the S-polarized light S at substantially a right angle with respect to the incident light toward the reflective element 22 by the polarization separation portion 21B of the polarization separation device 21, and thereby it is possible to make the S-polarized light S reflected by the reflective element 22 substantially parallel with the P-polarized light P. Therefore, since it is possible to easily arrange the light reflected by reflective element 22 and the light transmitted through the polarization separation device 21, it is possible to easily assemble the polarization conversion device 2.

(3) Since the transmissive substrate 21A is formed of quartz crystal, and quartz crystal is available at a lower cost than a crystalline material such as sapphire, it is possible to provide the polarization conversion device 2 at low cost.

(4) Since the angle made by the projection optical axis in which the crystal optical axis PO of the transmissive substrate 21A is projected onto the plane orthogonal to the optical axis of the incident light IL, and the polarization plane of the P-polarized light P is set as an azimuthal angle θ, θ is set to 0 (deg), it is possible to easily set the transmissive substrate 21A having a high polarization conversion efficiency under a condition in which a phase difference Γ does not occur by a birefringent property (Γ=0).

(5) Since the angle made by the crystal optical axis PO of the transmissive substrate 21A and the optical axis of the incident light IL is set as the intersection angle x, the axis, which is taken in a direction orthogonal to a plane including the crystal optical axis PO and the optical axis of the incident light IL at an intersection point of the crystal optical axis PO of the transmissive substrate 21A and the optical axis of the incident light IL, is set as a central axis, and when seen from a direction orthogonal to the plane including the crystal optical axis PO and the optical axis of the incident light IL, a counterclockwise direction of the central axis is set as a positive side, the intersection angle x satisfies a relationship of −90 (deg)≤x≤+90 (deg). Therefore, it is possible to reliably allow the P-polarized light P, which is transmitted through the polarization separation portion 21B and is incident to the transmissive substrate 21A, to be emitted from the emission-side surface of the transmissive substrate 21A while the P-polarized light P maintains the polarization plane thereof.

(6) The intersection angle x and the maximum value y in the plate thickness yo of the transmissive substrate 21A are obtained by an approximation for each of the plurality of areas. That is, in the case of "−90 (deg)≤x≤−80 (deg)", it is set to satisfy "$y=-0.0058x^2-0.9672x-38.858$ (mm)", in the case of "−80 (deg)<x≤−55 (deg)", it is set to satisfy "$y=2\times10^{-6}x^5+0.0008x^4+0.1145x^3+7.9738x^2+276.92x+3842.1$ (mm)", in the case of "−35 (deg)<x≤−15 (deg)", it is set to satisfy "$y=-4\times10^{-5}x^4-0.0045x^3-0.1828x^2-3.1831x-18.449$ (mm)", in the case of "−15 (deg)<x≤+5 (deg)", it is set to satisfy "$y=9\times10^{-6}x^4+0.0002x^3+0.0071x^2+0.1786x+2.4607$ (mm)", in the case of "+5 (deg)<x≤+10 (deg)", it is set to satisfy "$y=-0.5597x+6.3541$ (mm)", in the case of "+10 (deg)<x≤+30 (deg)", it is set to satisfy "$y=1\times10^{-5}x^4-0.0008x^3-0.0224x^2-0.2833x+2.0276$ (mm)", in the case of "+30 (deg)<x≤+35 (deg)", it is set to satisfy "$y=0.3878x-10.931$ (mm)", in the case of "+35 (deg)<x≤+75 (deg)", it is set to satisfy "$y=5\times10^{-9}x^6-2\times10^{-6}x^5+0.0002x^4-0.0176x^3+0.7441x^2-16.972x+165.72$ (mm)", and in the case of "+75 (deg)<x<+90 (deg)", it is set to satisfy "$y=9\times10^{-5}x^3-0.0215x^2+1.6761x-42.176$ (mm)". Therefore, it is possible to obtain the maximum value y in an appropriate plate thickness yo for each area, such that it is possible to obtain high polarization conversion efficiency, and thereby it is possible to make the optical characteristic good.

(7) Since the intersection angle x is set to satisfy a relationship of "−55 (deg)<x≤−35 (deg)", particularly, to approach −45 (deg), it is possible to obtain a good polarization conversion efficiency regardless of the maximum value y of the plate thickness yo.

(8) Since in the reflective element 22, the plate member to which the mirror portion 22B is provided is formed of quartz crystal instead of glass, the heat dissipation effect becomes high not only in the polarization separation device 21 but also in the reflective element 22, and thereby the heat resistance and the long operating life are further realized.

(9) Since the polarization separation portion 21B is formed of a dielectric multi-layer film, it is possible to simply manufacture the polarization separation device 21.

Next, a second embodiment of the invention will be described with reference to FIGS. 32 to 35.

The second embodiment is an example in which a polarization conversion unit 4 is provided to a liquid crystal projector 100 that is a projection type video apparatus, and is different from the conversion unit 1 of the first embodiment in a structure of the maintaining member 5.

Figure 32:
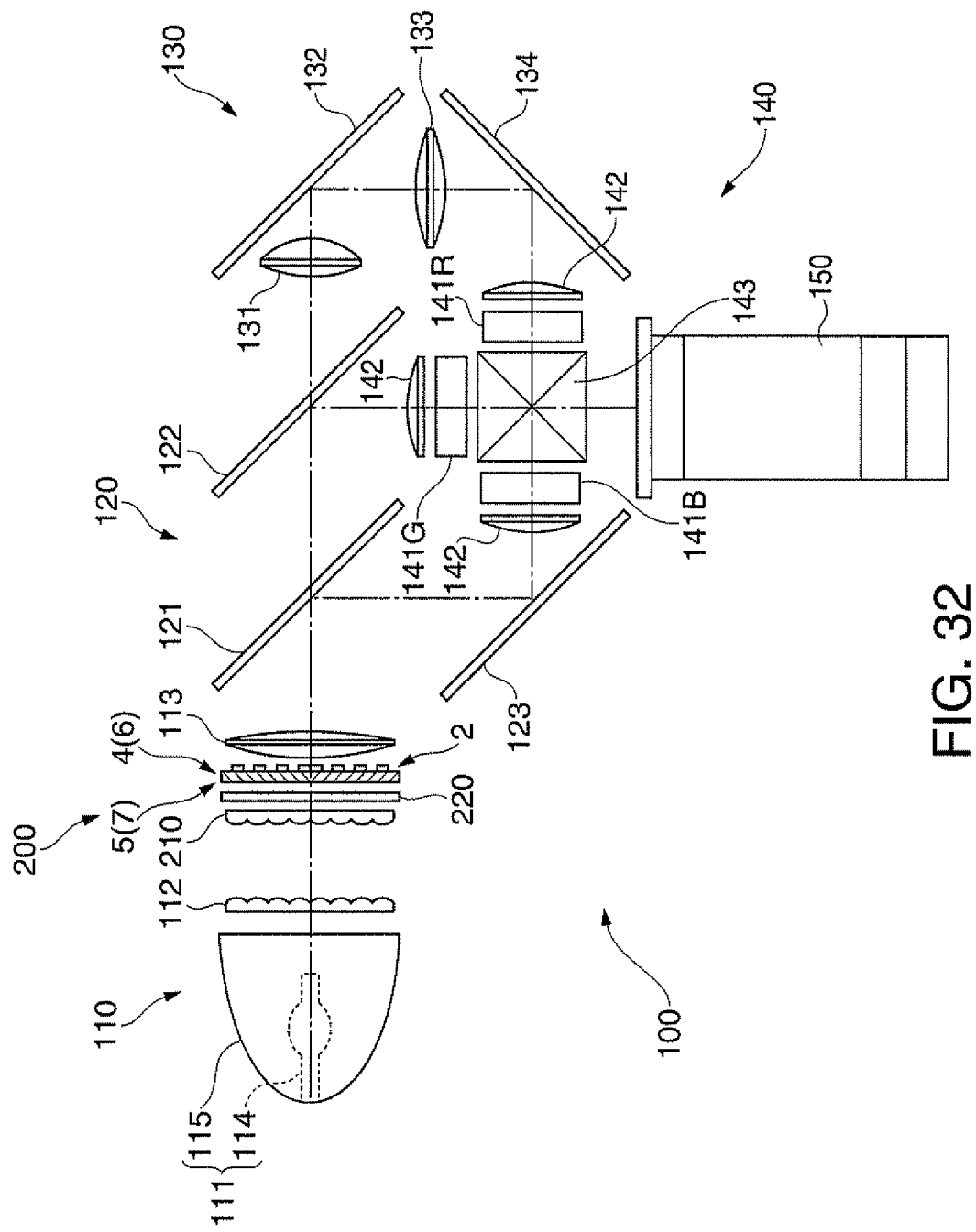
FIG. 32 is a schematic configuration diagram illustrating a liquid crystal projector into which a second embodiment of the invention is assembled.

FIG. 32 shows a schematic configuration of a liquid crystal projector.

In FIG. 32, the liquid crystal projector 100 includes an integrator illumination optical system 110, a color separation optical system 120, a relay optical system 130, an optical modulation device 140 that modulates light emitted from a light source according to image information, and a projective optical device 150 that enlarges and projects light modulated by the optical modulation device 140.

The integrator illumination optical system 110 is an optical system that substantially uniformly illuminates image forming regions of three sheets of transmissive liquid crystal panels 141R, 141G, and 141B described later, and includes a light source device 111, a first lens array 112, a polarization conversion device 200, and an overlapping lens 113.

The light source device 111 reflects a radiation-like light beams emitted from a light source lamp 114 by a reflector 115, makes the light beams substantially parallel, and outputs these substantially parallel light beams to the outside.

The polarization conversion device 200 includes a second lens array 210, a light shielding plate 220, and the polarization conversion unit 4 according to the second embodiment.

The color separation optical system 120 includes two sheets of dichroic mirrors 121 and 122, and a reflective mirror 123, and separates a plurality of light beams emitted from the integrator illumination optical system 110 into color light of three colors of red, green, and blue by the dichroic mirrors 121 and 122. The blue light separated by the dichroic mirror 121 is reflected by the reflective mirror 123, transmitted through a field lens 142, and reaches the transmissive liquid crystal panel 141B for a blue color.

Among the red light and the green light transmitted from the dichroic mirror 121, the green light is reflected by the dichroic mirror 122, transmitted through the field lens 142, and reaches the transmissive liquid crystal panel 141G for a green color.

The relay optical system 130 includes an incidence-side lens 131, a relay lens 133, and reflective mirrors 132 and 134. The red light separated by the color separation optical system 120 is transmitted through the dichroic mirror 122, and reaches the transmissive liquid crystal panel 141R for red light through the relay optical system 130 and the field lens 142.

The optical modulation device 140 includes the transmissive liquid crystal panels 141R, 141G, and 141B, and a cross dichroic prism 143. This cross dichroic prism 143 combines an optical image modulated for each color light and forms a color optical image.

The polarization conversion unit 4 includes the polarization conversion device 2 and the maintaining member 5 that maintains this polarization conversion device 2 that has the same structure as the first embodiment.

Figure 33:
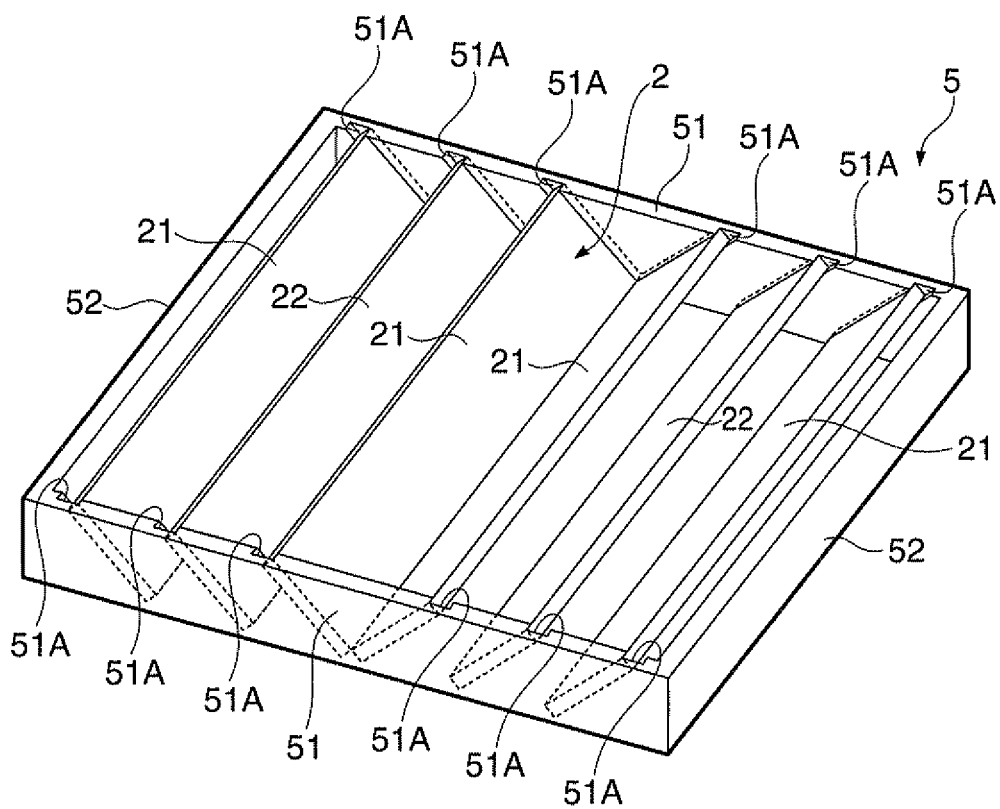
FIG. 33 is a perspective view illustrating a polarization conversion unit according to the second embodiment.
Figure 34A:
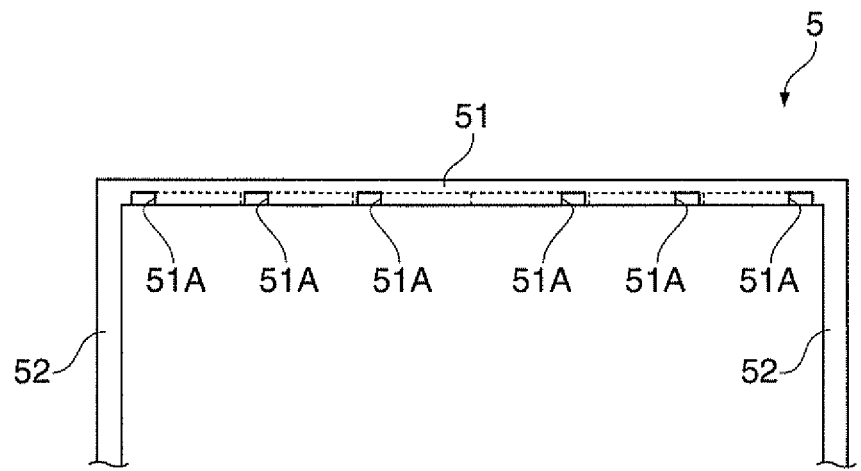
FIG. 34A is a plan view illustrating a maintaining member.
Figure 34B:
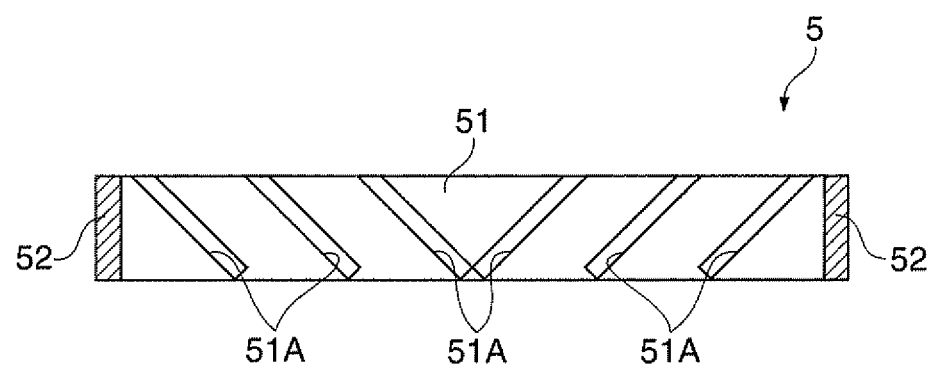
FIG. 34B is a cross-sectional view of the maintaining member.
Figure 35:
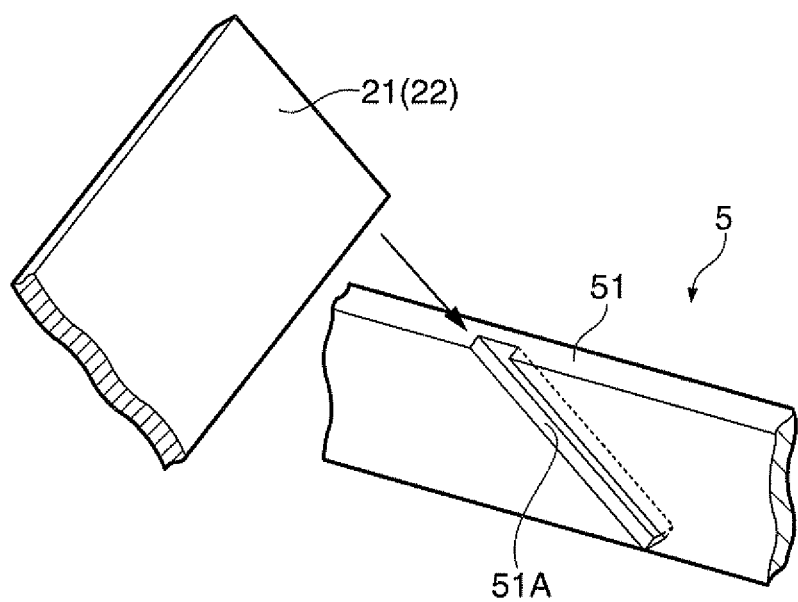
FIG. 35 is an exploded perspective view illustrating a part of the maintaining member.

A specific structure of the maintaining member 5 is shown in FIGS. 33 to 35.

FIG. 33 shows a perspective view of the maintaining member 5, FIG. 34A shows a plan view of the maintaining member 5, and FIG. 34B shows a cross-sectional view of the maintaining member 5.

In these drawings, the maintaining member 5 has a structure having a pair of maintaining plates 51 that maintains both ends of the polarization separation device 21 and both ends of the reflective element 22, and a pair of connecting plates 52 that connects both the ends of the pair of maintaining plates 51, respectively. The maintaining plates 51 and the connecting plates 52 are integrally formed of a synthetic resin in a planar rectangular frame shape.

A plurality of guide grooves 51A, which guides the polarization separation device 21 and the reflective element 22, respectively, is formed at portions of the pair of maintaining plates 51 that are opposite to each other. These guide grooves 51A are formed in such a manner that the longitudinal direction thereof is disposed at 45 deg or 135 deg with respect to the incident light.

The phase difference plate 23 is disposed at a position (not shown in FIG. 33) through which outgoing light emitted from the polarization separation device 21 passes. The phase difference plate 23 is fixed to the maintaining member 5 by an appropriate unit (not shown).

In addition, in FIG. 33 and FIGS. 34A and 34B, four pairs of guide grooves 31A that accommodate the polarization separation device 21, and two pairs of guide grooves 51A that accommodate the reflective element 22 are shown, but this is enlarged for easy comprehension of a configuration of the guide grooves 51A, and actually, it is configured in such a manner that two pairs of guide grooves 51A are provided to accommodate two sheets of the polarization separation devices 21 and two pairs of guide grooves 51A are provided to accommodate two sheets of the reflective element 22 in correspondence with the polarization conversion device 2 shown in FIG. 1. However, the number of the guide grooves 51A is not limited to the above-described configuration, but corresponds to the number of the polarization separation devices 21 and the reflective elements 22 that are actually provided.

FIG. 35 shows an exploded perspective view of a part of the maintaining member 5. In FIG. 35, a step difference is formed in the guide grooves 51A such that one end is opened toward one side surface of the maintaining plate 51, and the other end is brought into contact with an end of the polarization separation device 21 and the reflective element 22. Each of the guide grooves 51A is configured in such a manner that a width dimension thereof is equal to or slightly larger than that of the polarization separation device 21 or the reflective element 22, and a length dimension thereof is equal to or slightly larger than that of the polarization separation device 21 or the reflective element 22.

Therefore, in the second embodiment, it is possible to achieve the operational effect described below in addition to the same operational effects as (1) to (9) of the first embodiment.

(10) Since liquid crystal projector 100 includes the polarization conversion unit 4 having the polarization conversion device 2 that converts the light emitted from the light source device 111 into the S-polarized light S and emits this light, the optical modulation device 140 that modulates the outgoing light from the polarization conversion device 2 according to image information, and the projective optical device 150 that projects the light modulated by the optical modulation device 140, it is possible to make the projection accuracy of the liquid crystal projector 100 high along with an increase in polarization conversion efficiency of the polarization conversion device 2.

(11) Since the optical modulation device 140 includes the transmissive liquid crystal panels 141R, 141G, and 141B, from this aspect, it is possible to provide the liquid crystal projector 100 having high projection accuracy.

(12) Since the polarization conversion unit 4 has a configuration in which the maintaining member 5 that maintains the polarization conversion device 2 is provided, and the maintaining member 5 includes the pair of maintaining plates 51 that maintains both the ends of the polarization separation device 21 and both the ends of the reflective element 22, respectively, and the pair of connecting plates 52 that connects both the ends of the pair of maintaining plates 51, it is possible to accommodate the polarization separation device 21 and the reflective element 22 in the maintaining member in a compact manner and thereby the handling becomes easy.

(13) Since the pair of maintaining plates 51 and the pair of connecting plates 52 are integrally formed, it is possible to easily manufacture the maintaining member 5 through appropriate means such as an injection molding.

(14) Since at portions, which are opposite to each other, of the pair of maintaining plates 51, guide grooves 51A, which guide the polarization separation device 21 and the reflective element 22, respectively, are formed, and the guide grooves are opened toward one side surface of the pair of maintaining plates 51, it is possible to assemble the polarization conversion unit 4 by inserting the polarization separation device 21 and the reflective element 22 along the guide grooves 51A, such that an assembling work becomes easy.

Next, a third embodiment of the invention will be described with reference to FIGS. 36 and 37.

The third embodiment is different from the second embodiment in the configuration of the maintaining member, and in other respects the configuration is the same as that of the second embodiment.

Figure 36:
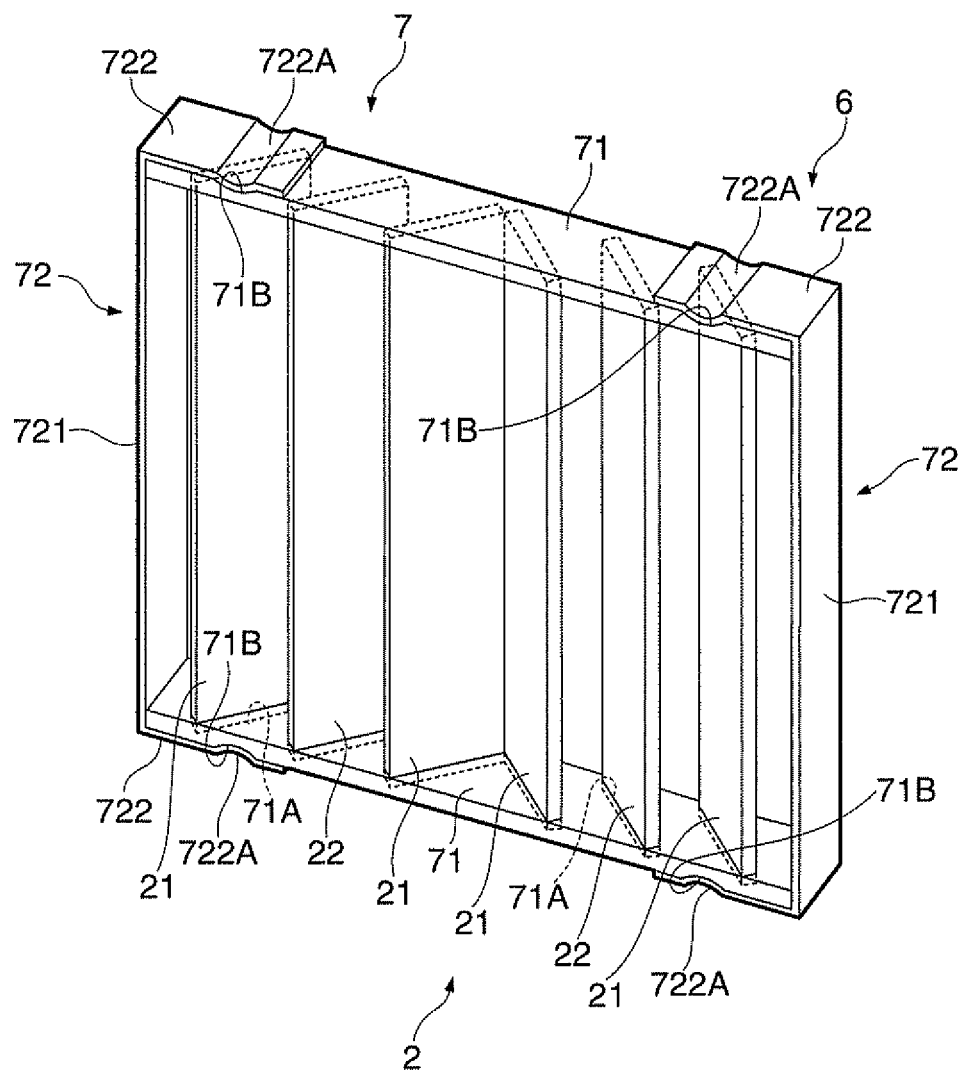
FIG. 36 is a perspective view illustrating a polarization conversion unit according to a third embodiment of the invention.
Figure 37:
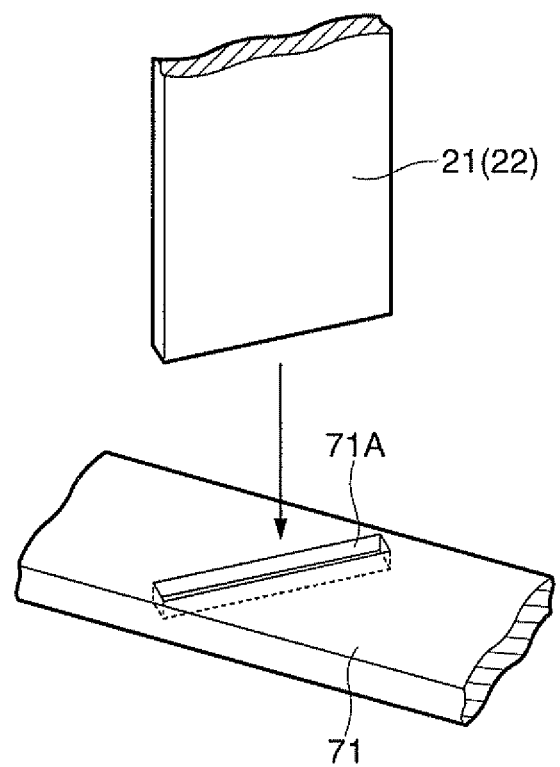
FIG. 37 is an exploded perspective view illustrating a part of the maintaining member.

FIG. 36 is a perspective view illustrating polarization conversion unit according to the third embodiment, and FIG. 37 shows an exploded perspective view illustrating a part of the maintaining member.

In these drawings, the polarization conversion unit 6 includes a polarization conversion device 2 and a maintaining member 7 that maintains the polarization conversion device 2 that have the same configuration as the first embodiment.

The maintaining member 7 includes a pair of maintaining plates 71, and a pair of connecting plates 72 that is provided to ends of the pair of maintaining plates 71, and the pair of maintaining plates 71 and the pair of connecting plates 72 are formed as individual members.

The pair of maintaining plates 71 is formed of a synthetic resin and has a plate shape, and a plurality of guide grooves 71A, which guides the ends of the polarization separation device 21 and the reflective element 22, respectively, are formed at portions, which are opposite to each other, of the pair of maintaining plates 71. These guide grooves 71A are formed in such a manner that the longitudinal direction thereof is disposed at 45 deg or 135 deg with respect to the incident light. In addition, the guide grooves 71A are concave portions in which a plane has a rectangular shape.

In the third embodiment, similar to the second embodiment, the phase difference plate 23 is disposed at a position (not shown) through which outgoing light emitted from the polarization separation device 21 passes. In addition, in FIG. 36, six pairs of the guide grooves 71A in total are shown, but actually, four pairs of guide grooves 71A are provided to accommodate four sheets of the polarization separation device 21 and four pairs of guide grooves 71A are provided to accommodate four sheets of the reflective element 22 in correspondence with the polarization conversion device 2.

The pair of connecting plates 72 includes a plate member 721 having an elongated shape, and an engagement piece 722 that is connected to the plate member 721 and biases the pair of maintaining plates 71 in a direction facing each other.

These plate member 721 and engagement piece 722 are integrally formed of an elastic material, for example, a metal, a synthetic resin, or the like. The engagement piece 722 is formed to be bent with respect to the plate member 721, and has a pressing portion 722A having a convex shape at a central portion thereof, which engages with a concave portion 71B formed in the maintaining plate 71. The pressing portion 722A having the convex shape and the concave portion 71B are formed to extend in a direction orthogonal to the longitudinal direction of the maintaining plate 71.

Therefore, in the third embodiment, it is possible to obtain the following operational effect in addition to the same operation effects as (1) to (12) of the second embodiment.

(15) The maintaining member 7 includes the pair of maintaining plates 71, and pair of connecting plates 72 provided at ends of the pair of maintaining plates 71, and the pair of connecting plates 72 includes the plate member 721 having an elongated shape, and the engagement piece 722 that is connected to the plate member 721 and biases the pair of maintaining plates 71 in a direction facing each other. Therefore, the pair of connecting plates 72 biases the pair of maintaining members 71 in a direction where the pair of maintaining members 71 becomes close to each other, such that it is possible to reliably maintain the polarization separation device 21 and the reflective element 22 using the maintaining member 7, and thereby it is possible to prevent the polarization separation device 21 and the reflective element 22 from being detached in error from the maintaining member 7.

(16) Since the engagement piece 722 has the pressing portion 722A that engages with the concave portion 71B formed in the maintaining plate 71, the connecting plate 72 is not dislocated in the longitudinal direction of the maintaining plate 71. Therefore, it is possible to prevent the connecting plate 72 from being separated in error from the maintaining plate 71.

(17) Since the guide grooves 71A, which are formed in the maintaining plate 71 and in which the ends of the polarization separation device 21 and the reflective element 22 are maintained, are concave portions in which a plane has a rectangular shape, a movement of the polarization separation device 21 and the reflective element 22 in the plane of the maintaining plate 71 is regulated. Therefore, from this aspect, the polarization separation device 21 and the reflective element 22 are not detached in error from the maintaining member 7.

Next, a fourth embodiment of the invention will be described with reference to FIG. 38.

The fourth embodiment is different from the first embodiment in the number of the phase difference plates, and in other respects the configuration is the same as the first embodiment.

Figure 38:
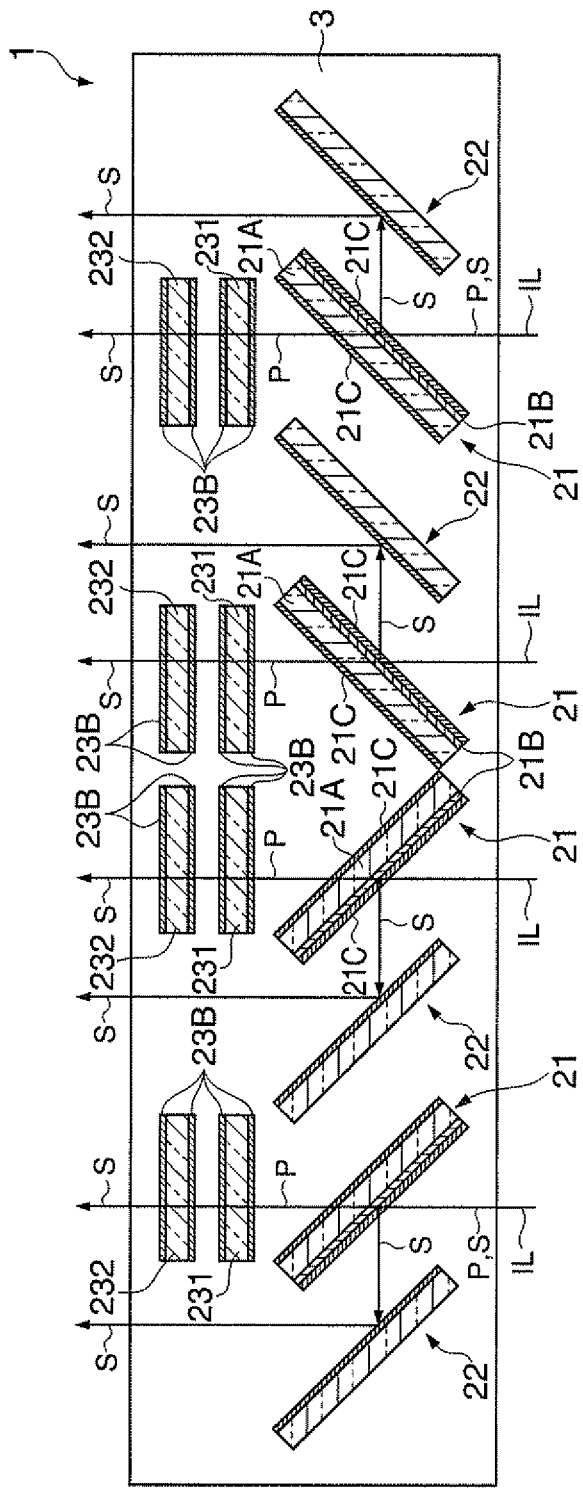
FIG. 38 is a schematic diagram illustrating a polarization conversion device according to a fourth embodiment of the invention.

FIG. 38 shows a schematic diagram of the polarization conversion device according to the fourth embodiment.

In FIG. 38, the polarization conversion device 2 includes the polarization separation device 21 and the reflective element 22 that are alternately disposed, and phase difference plates 231 and 232 that are disposed at a light emitting plane side of the polarization separation device 21 and are formed of quartz crystal, one end of each of the polarization separation device 21, the reflective element 22, and the phase difference plates 231 and 232 is fitted into a concave portion (not shown) of the maintaining member 3.

In the fourth embodiment, in regard to the phase difference plate 231 and the phase difference plate 232, two sheets thereof form one set, and are disposed in parallel with each other such that P-polarized light P transmitted through the polarization separation device 21 passes therethrough.

These phase difference plates 231 and 232 have a configuration in which an antireflective portion 23B is provided at both surfaces of each of wavelength plates.

The phase difference plate 231 having a phase difference Γ1 and the phase difference plate 232 having a phase difference Γ2 with respect to light of wavelength λ are disposed in such a manner that respective crystal optical axes intersect with each other. These phase difference plates 231 and 232 rotate P-polarized light P that is incident within a range of a wavelength λ1 to λ2 (however, λ1<λ<λ2) at an angle of 90 deg to convert the P-polarized light P into S-polarized light S and emit the converted S-polarized light S.

When an angle made by a polarization plane of linearly polarized light that is incident and a crystal optical axis of the phase difference plate 231 is set as an optical axis azimuthal angle θ1, and an angle made by a polarization plane of the linearly polarized light that is incident and a crystal optical axis of the phase difference plate 232 is set as an optical axis azimuthal angle θ2, the relationship between the optical axis azimuthal angle θ1 and the optical axis azimuthal angle θ2 satisfies the following equations (10) and (11).

$$\theta 2 = \theta 1 + 45 \tag{10}$$

$$0 < \theta 1 < 45 \tag{11}$$

A wavelength λ is set to the following range (12).

$$\lambda 1 < \lambda < (\lambda 2 - \lambda 1)/2 + \lambda 1 \tag{12}$$

The optical axis azimuthal angle θ1 is set to be shifted from the set value 22.5 deg such that when the phase difference Γ1 is set to a value of 180 deg, the phase difference Γ2 is set to a value of 180 deg, a variation amount in the phase difference of the phase difference plate 231 when the wavelength λ, varies is set to ΔΓ1, and a variation amount in the phase difference of the phase difference plate 232 when the wavelength λ varies is set to ΔΓ2 to satisfy the following equation (13).

$$\Delta\Gamma 1 = \Delta\Gamma 2 \tag{13}$$

In addition, other conditions of the phase difference plate 231 and the phase difference plate 232 are the same as those described in Japanese Patent No. 4277514.

Therefore, in the fourth embodiment, it is possible to obtain the following operational effect in addition to the same operational effect as (1) to (9) of the first embodiment.

(18) Since the phase difference plate is configured by two sheets of the phase difference plate 231 and the phase difference plate 232, it is possible to make the polarization conversion efficiency high at a wavelength region, for example, at a wavelength region from 400 nm to 700 nm that is used in a liquid crystal projector.

Next, a fifth embodiment of the invention will be described with reference to FIG. 39.

The fifth embodiment is different from the first embodiment in the configuration of the polarization separation device, and in other respects the configuration is the same as the first embodiment.

Figure 39:
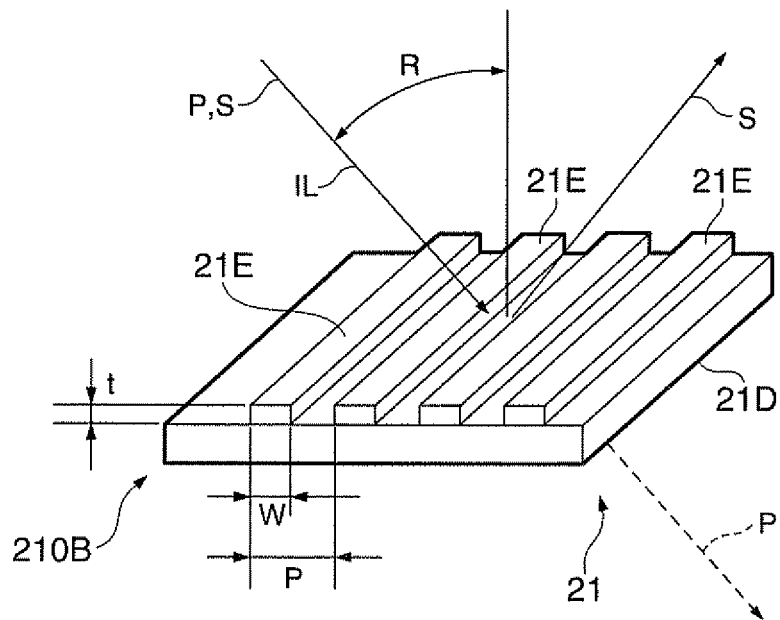
FIG. 39 is a perspective view illustrating a polarization separation device according to a fifth embodiment of the invention.

FIG. 39 shows a perspective view of a polarization separation portion 210B of a polarization separation device 21 according to the fifth embodiment.

In FIG. 39, the polarization separation portion 210B of the polarization separation device 21 is formed of a dielectric electrode 21E that includes a plurality of parallel metal wires that are supported by a dielectric substrate 21D. The dielectric electrode 21E has a pitch or cycle of P, a width of an individual conductor is W, and the thickness of the conductor is t. Incident light IL is incident to the polarization separation device 21 at an angle R from a perpendicular line. The incident light IL is reflected as S-polarized light S, and transmitted as P-polarized light P without being diffracted. Here, the cycle P, the width W, and the thickness t are set according to a frequency region of the light that is used and other conditions.

Therefore, according to the fifth embodiment, it is possible to obtain the following operational effect in addition to the same effects as (1) to (8) of the first embodiment.

(19) Since the polarization separation portion 210B of the polarization separation device 210 is formed of a metallic wire grid, it is possible to easily manufacture the polarization conversion device.

In addition, the invention is not limited to the above-described embodiments, and it is needless to say that modifications or improvements are included in the invention within a range capable of obtaining the object and effect of the invention.

For example, in the above-described embodiment, the antireflective portions 21C, 22B, and 23B are provided on both surfaces of the polarization separation device 21, the reflective element 22, and the phase difference plates 23, 231, and 232, but in the invention, it is not necessarily necessary to provide the antireflective portions 21C, 22B, and 23B. However, similar to each of the above-described embodiments, when the antireflective portions 21C, 223, and 23B are provided, a quantity of light that is transmitted through the polarization separation device 21, the reflective element 22, and the phase difference plates 23, 231, and 232 becomes large.

In addition, the polarization conversion device is used in the liquid crystal projector, but in the invention, the polarization conversion device may be used in a projective apparatus other than the liquid crystal projector.

In addition, it is not necessarily necessary to use quartz crystal in the reflective element 22, and glass may be used instead of quartz crystal. In addition, in the polarization separation devices 21, 231, and 232, it is not necessarily necessary to use quartz crystal in the transmissive substrate 21A, a crystalline material such as sapphire having a birefringent property and an optical rotatory property may be used instead of quartz crystal.

In addition, in the above-described embodiment, the polarization conversion device 21 is disposed at an angle of substantially 45 (deg) or 135 (deg) with respect to the incident light IL, but the invention is not limited to this, and for example, an angle of 60 (deg) or 120 (deg) may be adopted.

The invention may be used in a liquid crystal projector, and the other projection type video apparatuses.

The entire disclosure of Japanese Patent Application No. 2011-011086, filed Jan. 21, 2011 is expressly incorporated by reference herein.

What is claimed is:

1. A polarization conversion device, comprising:
a transmissive substrate that is disposed to form a predetermined angle with respect to incident light;
a polarization separation portion that is disposed on an incidence-side surface of the transmissive substrate, separates the incident light into first linearly polarized light and second linearly polarized light that are orthogonal to each other, transmits the first linearly polarized light, and reflects the second linearly polarized light; and
a reflective element that is disposed substantially in parallel with the transmissive substrate, and that reflects the second linearly polarized light reflected by the polarization separation portion in a direction that is substantially parallel with an optical path of the first linearly polarized light that is transmitted through the polarization separation portion,
wherein the transmissive substrate is formed of a crystalline material that has a birefringent property and an optical rotatory property, and a crystal optical axis that is an optical axis of the crystalline material that is not linear birefringent to light passing through the crystalline material,
the first linearly polarized light, which is transmitted through the polarization separation portion and is incident to the transmissive substrate, is emitted from an emission-side surface of the transmissive substrate while maintaining a polarization plane of the first linearly polarized light,
a phase difference plate opposing the emission-side of the transmissive substrate, converts the polarization plane of the first linearly polarized light that is transmitted through the transmissive substrate so as to be parallel with the polarization plane of the second linearly polarized light, and emits this light as second linearly polarized light,
wherein the second linearly polarized light does not propagate in the transmissive substrate and does not enter in the transmissive substrate; and
when an angle made by a projection optical axis in which the crystal optical axis of the transmissive substrate is projected onto a plane orthogonal to an optical axis of the incident light, and the polarization plane of the first linearly polarized light is set as an azimuthal angle θ, θ is 0 (deg).

2. The polarization conversion device according to claim 1, wherein the predetermined angle is substantially 45 (deg) or 135 (deg).

3. The polarization conversion device according to claim 1, wherein the crystalline material is quartz crystal.

4. The polarization conversion device according to claim 1, wherein when an angle made by the crystal optical axis of the transmissive substrate and the optical axis of the incident light is set as an intersection angle x,
an axis, which is taken in a direction orthogonal to a plane including the crystal optical axis and the optical axis of the incident light at an intersection point of the crystal optical axis of the transmissive substrate and the optical axis of the incident light, is set as a central axis, and
when seen from a direction orthogonal to the plane including the crystal optical axis and the optical axis of the incident light, a counterclockwise direction of the central axis is set as a positive side,
the intersection angle x satisfies the following relationship:

$-90 \text{ (deg)} \leq x \leq +90 \text{ (deg)}$.

5. The polarization conversion device according to claim 4, wherein the intersection angle x and a maximum value y in a plate thickness of the transmissive substrate satisfy the following relationships:

$-90 \text{ (deg)} \leq x \leq -80 \text{ (deg)}$ $y = -0.0058x^2 - 0.9672x - 38.858 \text{ (mm)}$.

6. The polarization conversion device according to claim 4, wherein the intersection angle x and a maximum value y in a plate thickness of the transmissive substrate satisfy the following relationships:

$-80 \text{ (deg)} < x \leq -55 \text{ (deg)}$ $y = 2 \times 10^{-6} x^5 + 0.0008 x^4 + 0.1145 x^3 + 7.9738 x^2 + 276.92 x + 3842.1 \text{ (mm)}$.

7. The polarization conversion device according to claim 4, wherein the intersection angle x satisfies the following relationship:

$-55 \text{ (deg)} < x \leq -35 \text{ (deg)}$.

8. The polarization conversion device according to claim 4, wherein the intersection angle x and a maximum value y in the plate thickness of the transmissive substrate satisfy the following relationships:

$-35 \text{ (deg)} < x \leq -15 \text{ (deg)}$ $y = -4 \times 10^{-5} x^4 - 0.0045 x^3 - 0.1828 x^2 - 3.1831 x - 18.449 \text{ (mm)}$.

9. The polarization conversion device according to claim 4, wherein the intersection angle x and a maximum value y in a plate thickness of the transmissive substrate satisfy the following relationships $-15 \text{ (deg)} < x \leq +5 \text{ (deg)}$ $y = 9 \times 10^{-6} x^4 + 0.0002 x^3 + 0.0071 x^2 + 0.1786 x + 2.4607 \text{ (mm)}$.

10. The polarization conversion device according to claim 4,
wherein the intersection angle x and a maximum value y in a plate thickness of the transmissive substrate satisfy the following relationships +5 (deg)<$x$≤+10 (deg)

$y = -0.5597x + 6.3541$ (mm).

11. The polarization conversion device according to claim 4,
wherein the intersection angle x and a maximum value y in a plate thickness of the transmissive substrate satisfy the following relationships:

+10 (deg)<$x$≤+30 (deg)

$y = 1 \times 10^{-5}x^4 - 0.0008x^3 - 0.0224x^2 - 0.2833x + 2.0276$ (mm).

12. The polarization conversion device according to claim 4,
wherein the intersection angle x and a maximum value y in a plate thickness of the transmissive substrate satisfy the following relationships +30 (deg)<$x$≤+35 (deg)

$y = 0.3878x - 10.931$ (mm).

13. The polarization conversion device according to claim 4,
wherein the intersection angle x and a maximum value y in a plate thickness of the transmissive substrate satisfy the following relationships:

+35 (deg)<$x$≤+75 (deg)

$y = 5 \times 10^{-9}x^6 - 2 \times 10^{-6}x^5 + 0.0002x^4 - 0.0176x^3 + 0.7441x^2 - 16.972x + 165.72$ (mm).

14. The polarization conversion device according to claim 4,
wherein the intersection angle x and a maximum value y in a plate thickness of the transmissive substrate satisfy the following relationships:

+75 (deg)<$x$<+90 (deg)

$y = 9 \times 10^{-5}x^3 - 0.0215x^2 + 1.6761x - 42.176$ (mm).

15. The polarization conversion device according to claim 1,
wherein the polarization separation portion is formed of a metallic wire grid.

16. The polarization conversion device according to claim 1,
wherein the polarization separation portion is formed of a dielectric multi-layer film.

17. The polarization conversion device according to claim 1,
wherein the reflective element includes a quartz crystal plate, and a mirror portion provided on a surface of the quartz crystal plate.

18. A polarization conversion unit, comprising:
the polarization conversion device according to claim 1; and
a maintaining member that maintains the polarization conversion device,
wherein the maintaining member includes,
a pair of maintaining plates that maintains both ends of the transmissive substrate and both ends of the reflective element, respectively, and
a pair of connecting plates that connects both the ends of the pair of maintaining plates, respectively.

19. The polarization conversion unit according to claim 18,
wherein the pair of maintaining plates and the pair of connecting plates are integrally formed,
at portions, which are opposite to each other, of the pair of maintaining plates, guide grooves, which guide the transmissive substrate and the reflective element, respectively, are formed, and
the guide grooves are opened toward one side surface of the pair of maintaining plates.

20. The polarization conversion unit according to claim 18,
wherein the pair of maintaining plates and the pair of connecting plates are formed as individual members, and
the pair of connecting plates includes an engagement piece that biases the pair of maintaining plates in a direction facing each other.

21. A projection type video apparatus, comprising:
a light source;
a polarization conversion device that converts light emitted from the light source into a second linearly polarized light and outputs this light;
an optical modulation unit that modulates the outgoing light from the polarization conversion device according to image information to be projected; and
a projection optical system that projects light modulated by the optical modulation unit,
wherein the polarization conversion device is the polarization conversion device according to claim 1.

22. The projection type video apparatus according to claim 21,
wherein the optical modulation unit is a liquid crystal panel.

* * * * *